United States Patent [19]

Tsuboi

[11] Patent Number: 4,970,537
[45] Date of Patent: Nov. 13, 1990

[54] CAMERA PERMITTING CLOSE-UP PHOTOGRAPHY

[75] Inventor: Takayuki Tsuboi, Kanagawa, Japan

[73] Assignee: Canon Kabushiki Kaisha, Tokyo, Japan

[21] Appl. No.: 423,663

[22] Filed: Oct. 18, 1989

Related U.S. Application Data

[63] Continuation of Ser. No. 259,433, Oct. 14, 1988, abandoned, which is a continuation of Ser. No. 861,616, May 5, 1986, abandoned, which is a continuation of Ser. No. 614,444, May 25, 1984, abandoned.

[30] Foreign Application Priority Data

| May 28, 1983 | [JP] | Japan | 58-93362 |
| May 28, 1983 | [JP] | Japan | 58-93363 |
| May 28, 1983 | [JP] | Japan | 58-93364 |
| Jul. 22, 1983 | [JP] | Japan | 58-113174[U] |
| Jul. 22, 1983 | [JP] | Japan | 58-113175[U] |

[51] Int. Cl.$^5$ ............ G03B 13/02; G03B 15/02; G03B 17/00
[52] U.S. Cl. ............ 354/126; 354/149.11; 354/221; 354/289.1; 354/413
[58] Field of Search .......... 354/481, 126, 145.1, 354/149.11, 166, 199–201, 400–403, 219–225, 412–424, 195.11, 195.1, 195.12, 442, 202

[56] References Cited

U.S. PATENT DOCUMENTS

| 2,618,209 | 11/1952 | Silent | 354/400 |
| 3,836,934 | 9/1974 | Suzuki et al. | 354/221 X |
| 4,112,447 | 9/1978 | Iwata | 354/145.1 |
| 4,191,460 | 3/1980 | Fujiki | 352/140 X |
| 4,238,153 | 12/1980 | Imura | 354/400 |
| 4,293,206 | 10/1981 | Tokutomi et al. | 354/400 |
| 4,367,934 | 1/1983 | Matsui | 354/403 |
| 4,482,234 | 11/1984 | Takagi et al. | 354/402 |
| 4,534,639 | 8/1985 | Konishi et al. | 354/481 X |
| 4,589,757 | 5/1986 | Maitani et al. | 354/458 |

Primary Examiner—W. B. Perkey
Attorney, Agent, or Firm—Toren, McGeady & Associates

[57] ABSTRACT

A camera permitting close-up photography has a normal photographing mode and a close-up photographing mode. A flash device, a view finder device, a distance measuring device, a photo-taking lens drawing out device, etc. of the camera are arranged to automatically shift to a condition suited for the close-up photography in response to the switch-over of the normal photographing mode to the close-up photographing mode.

234 Claims, 15 Drawing Sheets

CAMERA PERMITTING CLOSE-UP PHOTOGRAPHY

This is a continuation application of Ser. No. 07/259,433, filed Oct. 14, 1988, which in turn is a continuation application of Ser. No. 06/861,616, filed May 5, 1986, which in turn is a continuation application of Ser. No. 06/614,444, filed May 25, 1984, now all abandoned.

BACKGROUND OF THE INVENTION:

1. Field of the Invention:

This invention relates to a camera permitting close-up photography and more particularly to a camera which can be switched over from a normal photographing mode to a close-up photographing mode.

2. Description of the Prior Art:

A camera arranged to permit close-up photography has an advantage in that a desired object can be photographed in a larger size. Generally, however, it is a drawback of the camera of this kind that the camera becomes very expensive as it necessitates use of a photo-taking lens which is capable of permitting focusing over a wide range from an infinity distance to the nearest distance. To solve this problem, Japanese Laid-Open Patent Application No. SHO 54-55836 has disclosed a camera in which the depth of field is increased by stopping down a diaphragm aperture to enable the lens to be focused on an object located at a nearer distance and the insufficiency of exposure to light due to the stopped down aperture is covered by flashing a flash device. In accordance with this prior art method, however, the image of an object to be photographed is watched through a view finder which remains in the same condition for the object distance from the infinity distance to the nearest distance. Therefore, at the time of close-up photography, the picture watched through the view finder comes to greatly deviate from a picture to be actually photographed thus presenting the problem of parallax.

Further, in cases where the camera of the kind permitting close-up photography is provided with a distance measuring device which automatically measures the object distance to detect the focal point of the photo-taking lens, since the distance measuring range increases in that instance in the direction of the nearest distance, the camera comes to necessitate use of either many distance measuring sensors or an extremely large distance measuring sensor. However, the use of many distance measuring sensors or a large distance measuring sensor results not only in a very expensive distance measuring device but also in a larger device which is detrimental to the reduction in size and cost of the camera desired.

Meanwhile, an attempt to shorten a base length and to obtain a wide distance measurable range with a smaller number of distance measuring sensors, for example, degrades the resolving power of the distance measuring device. Such an attempt thus eventuates in a camera which tends to make distance measurement errors.

SUMMARY OF THE INVENTION

This invention is directed to the solution of the above-stated various problems of the camera of the kind arranged to permit close-up photography.

A first object of the invention is to provide a camera which permits switch-over from a normal photographing mode to a close-up photographing mode and wherein the parallax of the view finder of the camera is corrected in response to a mode switch-over operation, so that an adequate photograph can be taken even in the event of the close-up photographing mode.

A second object of the invention is to provide a compact and low-cost distance measuring device for a camera permitting close-up photography, wherein the distance measurable range of the distance measuring device is shifted toward a nearer distance range in the event of close-up photography, so that distance measurement can be carried out appositely to the close-up photographing operation.

A third object of the invention is to provide a camera of the kind having a distance measuring device and permitting close-up photography, wherein, in the event of close-up photography, the distance measuring device is rendered inoperative and the focal point of the camera is manually shifted to a predetermined point suited for close-up photography, so that an apposite focal point can always be obtained with compact and low-cost arrangement.

A fourth object of the invention is to provide a camera permitting close-up photography, wherein an automatic flash mechanism is arranged to flash and operate in relation to an aperture diameter set according to the object distance at the time of flash photography; and the automatic flash mechanism is provided with switch-over means which, in the event of close-up photography, further reduces the aperture diameter determined for flash photography by the automatic flash mechanism at the time of normal photography, so that close-up photography can be correctly carried out with extremely simple arrangement.

A fifth object of the invention is to provide a camera permitting close-up photography, wherein there is provided switch-over mean for switching the photo-taking lens drawing-out or -in position of a normal photographing mode over to that of a close-up photographing mode for the same object distance from a distance measuring device, so that the lens can be appositely focused for close-up photography.

A sixth object of the invention is to provide a camera permitting close-up photography by utilizing emission of a flash of light, wherein there is provided automatic returning means which, upon completion of photographing in a close-up photographing mode, automatically brings the camera back to a normal photographing mode to prevent an erroneous operation in te normal photographing mode and also to prevent a battery from being wastefully consumed by neglecting to switch-off the flash device after the close-up photographing operation.

These and further objects and features of the invention will become apparent from the following detailed description of the preferred embodiments thereof taken in connection with the accompanying drawings.

BRIEF DESCRIPTION OF THE DRAWINGS

FIG. 1 shows it as in a normal photographing mode and FIG. 2 as in a close-up photographing mode.

FIG. 4 shows it as in a charged position; FIG. 5 shows it as in the process of adjusting the focus to a far distance; FIG. 6 shows it as in a state of having completed the far distance adjustment; FIG. 7 shows it as in the process of adjusting the focus to a medium distance; FIG. 8 shows it also as in the process of adjusting the focus to a medium distance; and FIG. 9 shows it as in a state of having completed the medium distance adjustment.

FIG. 14 as in the process of adjustment to a far distance; FIG. 15 also as in the process of adjustment to a far distance; and FIG. 16 as in a state of having completed the far distance adjustment.

FIGS. 17(a), 17 (b), 17 (c) are wave form charts respectively showing timing for effecting power supply to a rotor arranged to control the above-stated focus adjusting device, FIG. 17(a) showing the power supply timing in the normal photographing mode.

FIG. 18 is an exploded oblique view showing the essential parts of the second embodiment as in a charged state under the condition of a normal photographing mode. FIG. 19 is a front view showing a part of an automatic focus control mechanism cf the second embodiment. FIG. 20 is an exploded oblique view showing the essential parts of the second embodiment as in a charged state for a flash photographing mode. FIG. 21 is an exploded oblique view showing the essential parts of the second embodiment as in a charged state for a close-up photographing mode. FIG. 22 is a wave form chart showing timing for effecting power supply to a motor in carrying out automatic focus control in the second embodiment.

DETAILED DESCRIPTION OF THE PREFERRED EMBODIMENTS

Figure 1:
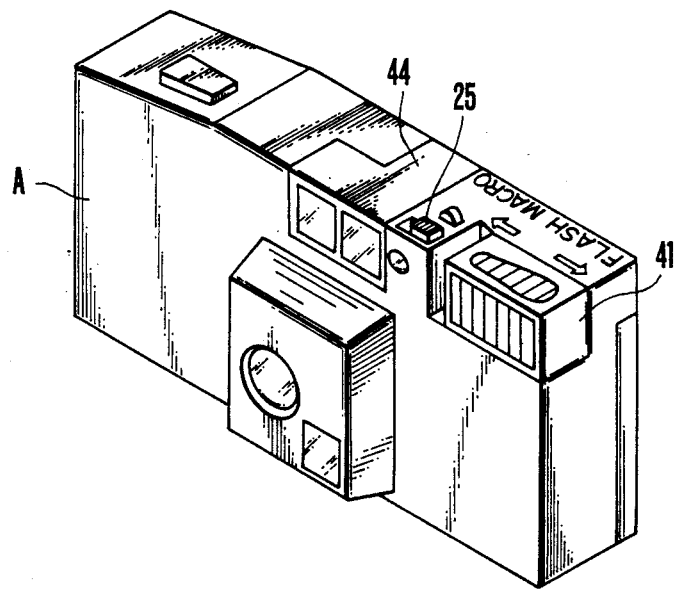
FIGS. 1 and 2 oblique views showing the appearance of a camera arranged according to the present invention as a first embodiment thereof.
Figure 2:
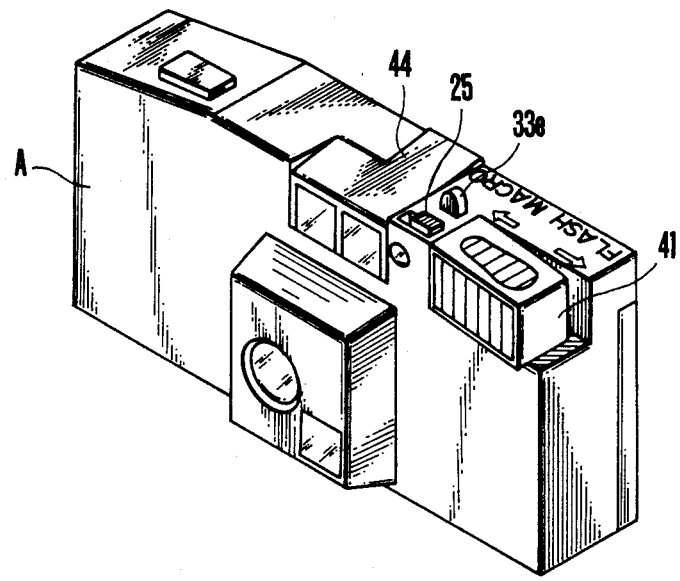
Figure 3:
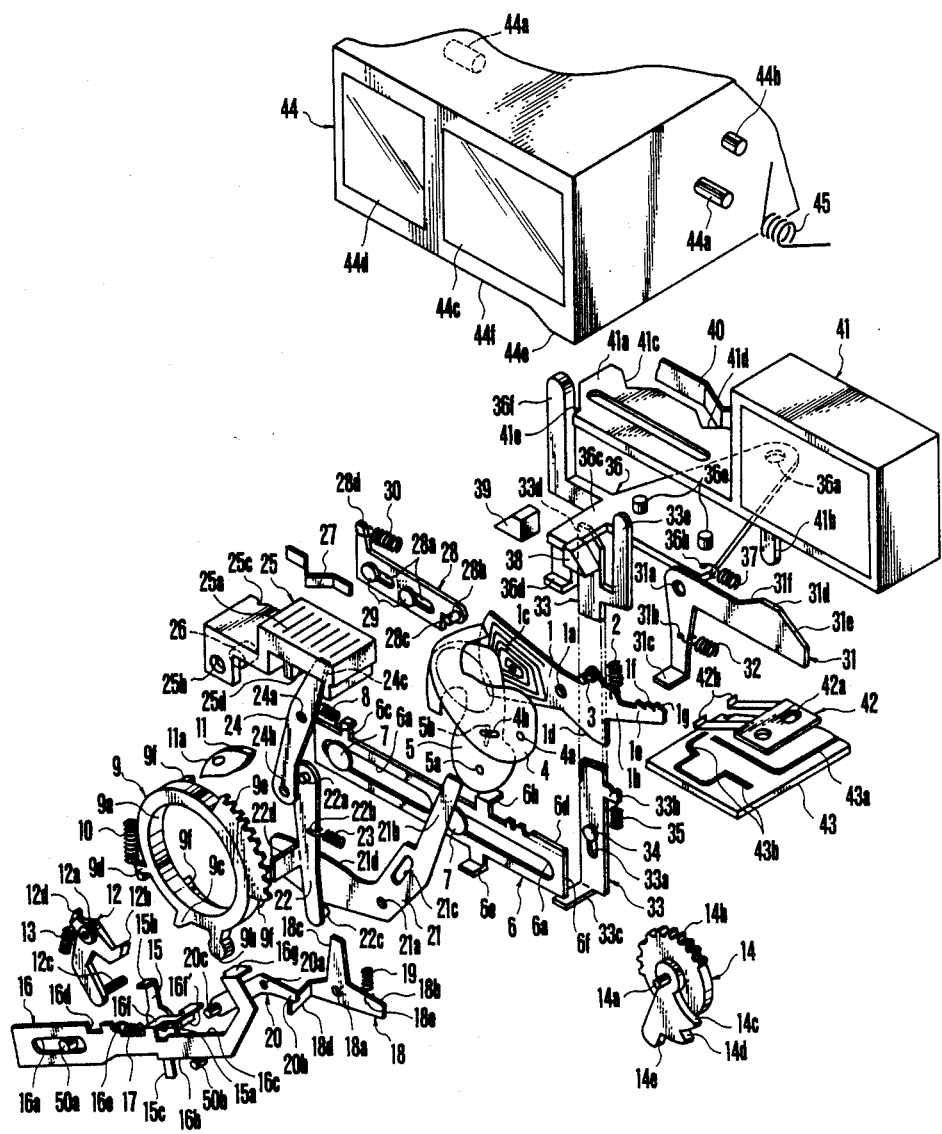
FIG. 3 is an exploded oblique view showing the essential parts of the internal mechanism of the first embodiment as in the normal photographing mode.

A camera which is arranged according to the invention as a first embodiment thereof has its appearance as shown in FIGS. 1 and 2. FIG. 1 shows its appearance as in a normal photographing mode and FIG. 2 as in a close-up photographing mode. FIG. 3 is an exploded oblique view showing the arrangement of the internal mechanism of the camera as in the normal photographing mode.

Referring to FIG. 3, a rotor 1 is provided with a middle hole 1a and is pivotally carried by a pin provided on a shutter base plate at the hole 1a. A spring 2 which is hooked on another hole 1b of the rotor 1 urges the rotor 1 to turn counterclockwise. However, the rotor 1 remains in the position as shown in FIG. 3 by abutting on a stopper (not shown). A spiral conductive pattern 1c is formed on the surface of one side of the rotor 1. On the other side of the rotor 1 are provided a brake part 1d which is arranged on the periphery of the rotor to abut on the bent up part 6b of a set plate 6 and claws 1e, 1f and 1g for automatic focusing (hereinafter will be called AF for short) which are arranged to abut on a bent up part 16f of a distance control lever 16 to stop the lever from operating. A blade driving pin 3 is caulked and secured to the front surface of the rotor 1.

Under the condition as shown in FIG. 3, when power supply is effected by an electrical circuit (not shown) to the conductive pattern of the rotor 1, the rotor 1 turns clockwise against the urging force of the spring 2 according to the Fleming's left-hand rule with a magnet and a yoke (not shown) disposed at a distance in front and rear of the rotor 1. The above-stated blade driving pin 3 is arranged to fittingly engage the cam slots 4b and 5b of shutter blades 4 and 5 and to come to collide with the cam face 21d of an AF lever 21.

The shutter blades 4 and 5 are provided with holes 4a and 5a and are pivotally carried at these holes by pins provided on the above-stated shutter base plate. When the rotor 1 turns, the blade driving pin 3 opens and closes these blades.

The above-stated set plate 6 is provided with a pair of long slots 6a and is slidably carried by pins 7 provided on the shutter base plate. A spring 8 is hooked on a projection 6c of the set plate 6 and is arranged to urge the plate 6 to move leftward. Meanwhile, however, a winding charge mechanism (not shown) causes the set plate 6 to slide rightward against the force of the spring 8. Then, a locking member (not shown) keeps the set plate 6 in the charged position as shown in FIG. 3. Further, the bent up part 6b of the set plate abuts on the brake part 1d of the rotor 1 as mentioned above. When the rotor 1 is energized, the movement of the rotor 1 is restricted by the bent up part 6b. A rack part 6d of the set plate 6 is arranged to ensure a constant speed of movement by engaging a governor mechanism (not shown). Another bent up part 6e of the set plate is arranged to engage the arm part 15c of a lens barrel connecting lever 15 which will be described later herein. A contact piece (not shown) is carried by and arranged in one unified body with the set plate 6 to supply through a circuit pattern (not shown) information on the travelling position of the set plate 6 to an IC which is arranged to control the sequence of operations of the camera.

A distance ring 9 is turnably fitted on the base plate of a lens barrel (not shown) at its inner diameter part 9a. The outer circumferential face of the distance ring 9 is provided with a charging projection 9b, a claw part 9c, a hook part 9d and a gear part 9e. A spring 10 which is hooked on the hook part 9d is urging the distance ring 9 to turn clockwise as viewed on the drawing. However, when the ring 9 is turned counterclockwise by a charge mechanism (not shown) via the charging projection 9b against the force of the spring 10, a claw part 12b of a stop pawl 12 which will be described later engages the claw part 9c to lock the ring 9 in a charged position. The gear part 9e engages the gear part 14b of a stop wheel 14 which will be described later. Further, the ring 9 is provided with three drawing out cam parts 9f which are evenly spaced along the circumference of the ring 9 on the rear side thereof. Against these cam parts 9f are pushed by a spring (not shown) three projections 11a which are disposed on a part of a photo-taking lens barrel 11. The photo-taking lens is thus arranged to be drawn out according to the turning degree of the distance ring 9.

The stop pawl 12 is provided with a hole 12a and is pivotally carried by the lens barrel base plate via the hole 12a. A spring 13 which is hooked on the hook part 12d of the stop pawl 12 urges the pawl 12 to turn counterclockwise as viewed on the drawing. However, a stopper (not shown) prevents the pawl 12 from turning further than the position shown by having the pawl come to abut thereon. As mentioned above, the pawl 12 is provided also with the driving pin 12c in addition to the claw part 12b which locks the distance ring 9. When the above-stated set plate 6 shifts leftward from the charged position of FIG. 3 to a certain point, the above-stated driving pin 12c of the stop pawl 12 abuts on the left end part of the set plate 6 to cause the stop pawl 12 to turn clockwise disengaging thereby the claw part 12b from the claw part 9c of the distance ring 9.

The stop wheel 14 is provided with a shaft 14a and is rotatably carried through the shaft 14a by a structural member of the camera (not shown). The gear part 14b of the stop wheel 14 engages the gear part 9e of the distance ring 9 to transmit the turning motion of the distance ring 9 to the stop wheel 14. Meanwhile, a sector wheel which is provided with a claw 14c for a far distance, a claw 14d for a medium distance and a claw 14e for a near distance is arranged in one unified body with the stop wheel 14. These claws are arranged to engage the bent up part 16g of a distance control lever 16 which will be described later herein.

The above-stated lens barrel connecting lever 15 is provided with a hole 15a and is pivotally carried at the hole 15a by the above-stated structural member. A bent up part 15b formed at one end of the lever 15 engages a notch part 16d of the distance control lever 16. An arm part 15c formed at the other end of the lever 15 is arranged to engage the bent up part 6e of the set plate 6.

The distance control lever 16 is provided with a long slot 16a which is fitted on a shaft 50a protruding from the above-stated structural member. Meanwhile, another shaft 50b is also protruding from the same structural member. The distance control lever 16 is slidably and swingably carried between this shaft 50b and a pin 20c of a movable lever 20 which will be described later. A spring 17 which is attached to a hook part 16e of the distance control lever 16 urges the lever 16 to move rightward as viewed on the drawing. Under the condition shown in FIG. 3, the lower side part 16b of the lever 16 engages the shaft 50b to determine the position of the distance control lever 16 while the upper side part 16c of the lever 16 is away from the above-stated pin 20c. As mentioned above, the distance control lever 16 is provided with a notch part 16d and bent up parts 16f, 16f and 16g.

A close-up reset lever 18 is provided with a hole 18a and is pivotally carried at the hole 18a by the above-stated structural member. A strong spring 19 is hooked on a hole 18e provided in one of the arm parts 18b of the lever 18 and is arranged to urge the lever to turn counterclockwise as viewed on the drawing. This causes the arm part 18b to engage a bent up part 33c of the lower end of a reset lever 33 which will be described later. Under the condition of FIG. 3, the fore end part 33d of the reset lever 33 abuts on a protrudent part 36c of a flash device carrying plate 36 which will be described later and the reset lever 18 is in repose. The close-up reset lever 18 is further provided with an arm part 18c which is slightly away from the end part 6f of the set plate 6 with the set plate 6 in the charged state as shown in FIG. 3 and another arm part 18d which engages the arm part 20b of the movable lever 20 which is arranged as described below:

The movable lever 20 is pivotally carried the above-stated structural member at its hole 20a. An arm part 20b formed at one end of the movable lever 20 engages the above-stated close-up reset lever 18 as mentioned above while a pin 20c is caulked and secured to the other end of the lever 20. The pin 20c is arranged to stop the distance ring 9 from turning during the process of distance measurement by having the upper side part 16c of the distance control lever 16 come to abut thereon. By this, the arm part 18b to or -in extent of the photo-taking lens is controlled.

A reference numeral 21 denotes an automatic flashing (hereinafter will be called FA) lever. This lever 21 is pivotally carried at its hole 21a by the above-stated structural member. The FA lever 21 is provided with an arm part 21b which engages a bent up part 31c of a flash device detecting lever 31 which will be described later; a cam slot 21c fitted on a pin 22c of a distance signal lever 22 which will be described later; and a cam part 21d arranged to restrict the position of the driving pin 3 of the rotor 1 which drives the above-stated shutter blades 4 and 5. However, under the condition as shown in FIG. 3, the engagement between the arm part 21b and the bent up part 31c of the flash device detecting lever 31 disengages the cam part 21d and the driving pin 3 from each other.

The distance signal lever 22 is provided with a shaft 22a at one end thereof and has the shaft 22a fitted in a hole 24b of an ISO film sensitivity value setting shifting lever 24. A spring 23 is hooked on a hole 22b of the distance signal lever 22 and urge the lever to turn counterclockwise as viewed on the drawing. The pin 22c which is provided at the other end of the lever 22 is fitted in the cam slot 21c of the FA lever 21 as mentioned above. A bent up part 22d of the lever 22 engages the bent up part 16f of the above-stated distance control lever 16 to have the extent of displacement of the distance control lever 16 transmitted to the distance signal lever 22. However, when the camera is not in the flash photographing mode, the distance signal lever 22 remains in a position not engaging the distance control lever 16.

The above-stated ISO shifting lever 24 is arranged to be turnable on the shaft 28b of a close-up lever 28 on which the hole part 24a of the lever 24 is fitted. The lever 24 is provided with another hole 24b which has the shaft 22a of the distance signal lever 22 fitted therein as mentioned above and an arm part 24c which fits in the recessed part 25d of an ISO film sensitivity value shifting knob 25.

The ISO shifting knob 25 consists of an operation knob part 25a which protrudes from the upper surface of the camera body; an ND filter part 25b which is arranged to reduce the quantity of light incident on a photo-sensitive element 26 in response to an ISO value shifting operation; a plurality of click grooves 25c which are provided for positioning by a click spring 27; and the above-stated recessed part 25d which is formed in the lower side of the knob. With these parts arranged in one unified body, the knob 25 is slidably carried by a known means and is slidable to the left and right. Under the condition of ISO film sensitivity value 400, the ND filter part 25b is positioned in front of the photo-sensitive element 26.

The above-stated close-up lever 28 is slidably carried to be slidable to the left and right with shafts 29 fitted into the pair of long slots 28a thereof. The lever 28 is further provided with a shaft 28b which is disposed at one end of the lever 28 and is arranged to fit into the hole part 24a of the ISO shifting lever 24 as mentioned above; a stepped part 28c which is arranged to engage a bent up part 36d of a flash device carrying plate 36; and a protrudent part 28d which is formed at the other end and has a spring 30 hooked thereon to urge the lever 28 to slide to the right as viewed on the drawing.

The above-stated flash device detecting lever 31 is formed into an L shape and is pivotally carried by the above-stated structural member through a hole 31a. A spring 32 which is hooked on another hole 31b of the lever 31 urges the lever to turn counterclockwise as viewed on the drawing. The lever 31 is provided with a high cam edge part 31d and low cam edge parts 31e and 31f which are formed on one arm part of the lever and are arranged to abut on a projection 41b protruding from the lower side of a flash device frame body 41 which will be described later. Meanwhile, a bent up part 31c which is formed at the fore end of the other arm part of the lever 31 has the arm part 21b of the FA lever 21 abutting thereon as mentioned in the foregoing.

The above-stated reset lever 33 has a shaft 34 which is provided at a part of the above-stated structural member fitted in its long slot part 33a. The lever 33 is thus slidable upward and downward as viewed on the drawing and is urged to slide downward by a weak spring 35 which hangs on a spring peg part 33b. However, as mentioned in the foregoing, the arm part 18b of the close-up reset lever 18 is abutting on the bent up part 33c formed at the lower end of the lever 33 and the counterclockwise turning force of the spring 19 exerted on the close-up reset lever 18 pushes the reset lever 33 upward. The reset lever 33 is further provided with an upper end part 33d which is pushed down by the protrudent part 36c of the flash device carrying plate 36 under the condition as shown in FIG. 3; and a display part 33e which, under the condition of the close-up photographing mode, protrudes to the outside from a through hole of the camera body A to inform the photographer of the close-up photographing mode and is arranged to permit cancellation of the close-up photographing mode by pushing back this protrudent display part 33e.

The flash device carrying plate 36 is pivotally carried through a hole 36a by the above-stated structural member and is turnable between stoppers 38 and 39. A strong spring 37 which is hooked on a spring peg part 36b urges the plate 36 to turn counterclockwise as viewed on the drawing. The above-stated protrudent part 36c is arranged to abut on the stopper 38 or 39 to restrict the turning movement of the plate 36. The protrudent part 36c has a bent up part 36d. In the event of the close-up photographing mode, the bent up part 36d which abuts on the stepped part 28c of the close-up lever 28 serves to shift the lever 28 to the left in response to the movement of the flash device frame body 41 which will be described later and the lever 28 is thus carried by the bent up part 36d in that event. The plate 36 is provided with a pair of shafts 36e which are arranged to fittingly engage a guide slot 41a provided in the flash device frame body 41; a projection 36f which causes a view finder block 44 to move in association with the movement of the flash device carrying plate 36; and a click spring 40.

The flash device frame body 41 contains therein a flash tube, a reflector, etc. (not shown) and is carried to be slidable rightward and leftward with the pair of shafts 36e of the flash device carrying plate 36 fitted in the guide slot 41a as mentioned in the foregoing. Meanwhile, the protrudent part 41b is arranged to abut on the cam edge parts 31d, 31e and 31f of the flash device detecting lever 31 and thus to displace the flash device detecting lever 31 according to the shift of position of the flash device frame body 41. The frame body 41 is further provided with click grooves 41c and 41d which are arranged to engage the click spring 40 of the flash device carrying plate 36; and a stepped part 41e which is arranged at one side edge to engage the projection 36f of the plate 36.

A contact part 42 is secured to the lower surface of the flash device frame body 41 by means of a screw or the like via a hole 42a. The contact part 42 is provided with contact pieces 42b which are arranged to slide over patterns 43a and 43b provided on a circuit substrate 43 according as the flash device frame body 41 moves. By this, an IC of the camera (not shown) is informed of the photographing mode employed. The flash device frame body 41 is further provided with a charging contact piece (not shown) which is arranged to cause a charging process to begin on the flashing capacitor of the flash device in synchronism with the on and off timing of the contact between the contact part 42 and the patterns 43a and 43b.

The view finder block 44 is turnably carried by the above-stated structural member through a pair of shafts 44a. A spring 45 which is attached to a spring peg part 44b urges the view finder block 44 to turn counterclockwise as viewed on the drawing. An automatic focusing light receiving window 44c and a view finder window 44d are provided side by side in front of the block 44. Meanwhile, the cam parts 44e and 44f which are formed at the lower side of the block 44 are arranged to abut on the projection 36f of the above-stated flash device carrying plate 36 as mentioned in the foregoing. Under the condition of the normal photographing mode as shown in FIG. 3, it is the cam part 44e that is abutting on the projection 36f of the carrying plate 36.

Figure 4:
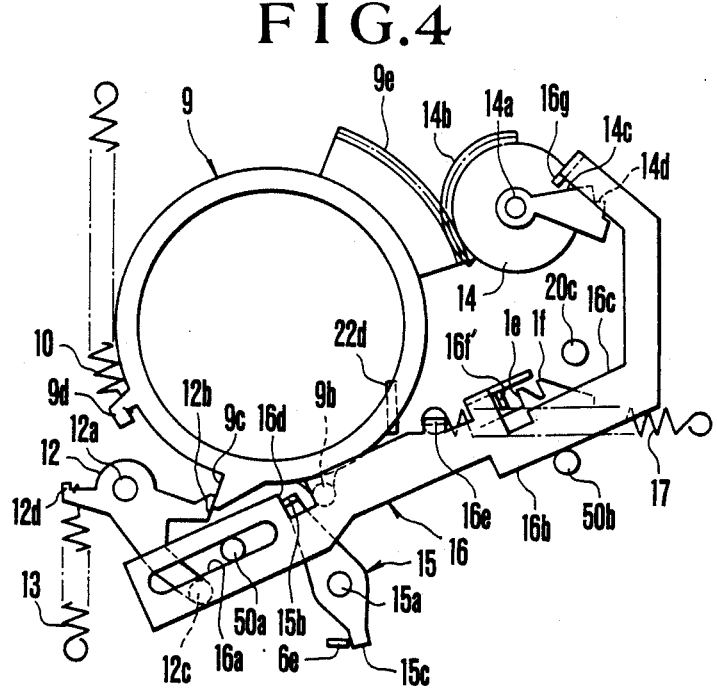
FIGS. 4 through 9 are illustrations of the operation of the focusing or focus adjusting part of the embodiment.

With the embodiment arranged as described above, it operates as follows:

First, in the normal photographing mode, the winding charge mechanism (not shown) causes the set plate 6 to slide to the right against the force of the spring 8 and is locked in the charged position as shown in FIG. 3 by a locking member (not shown). At the same time as this, the distance ring 9 is turned counterclockwise against the force of the spring 10. Then, the claw part 12b of the stop pawl 12 engages the claw part 9c of the ring 9 to lock the ring 9 in a charged position. FIG. 4 is a front view showing the charged conditions of the essential parts of the focus adjusting part including the distance ring 9.

With the camera directed to an object to be photographed, when a shutter release button (not shown) is depressed to the extent of a first stroke thereof, information on a distance to the object is stored within the IC of the camera. When the release button is further depressed to a second stroke thereof, the set plate 6 is unlocked to allow the set plate 6 to begin to travel by the force of the spring 8 to the left at a constant speed under the control of the governor mechanism (not shown). A contact piece (not shown) then slides over a circuit pattern to produce a start signal representative of the start of the set plate 6. The start signal is supplied to the IC to have a distance adjusting action initiated.

Figure 5:
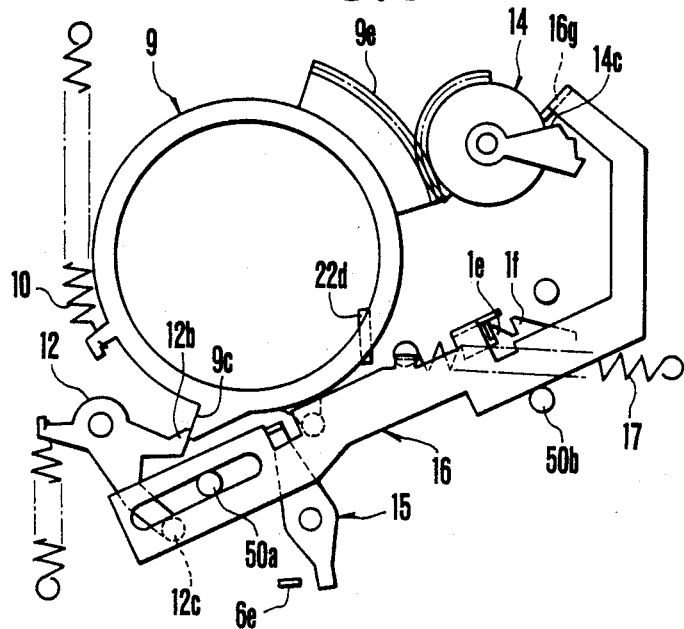

If the object to be photographed is located at a far distance, the start signal of the set plate 6 does not cause any power supply to be effected to the conductive pattern 1c. Therefore, the rotor 1 stays in the position as shown in FIGS. 3 and 4. Meanwhile, the distance control lever 16 is caused by the travel of the set plate 6 to begin to move at a constant speed by the force of the spring 17 obliquely upward to the right from the position shown in FIG. 4 together with the turning movement of the lens barrel connecting lever 15. The bent up part 16f' of the lever 16 then abuts on the claw 1e of the rotor 1 to bring the lever 16 to a stop in a position as shown in FIG. 5. The bent up part 16f' of the distance control lever 16 in this instance comes to abut on the abutting face of the claw 1e of the rotor 1 in the direction toward the rotation axis of the rotor 1. Therefore, the abutting contact of the bent up part 16f' does not cause the rotor 1 to turn.

Figure 6:
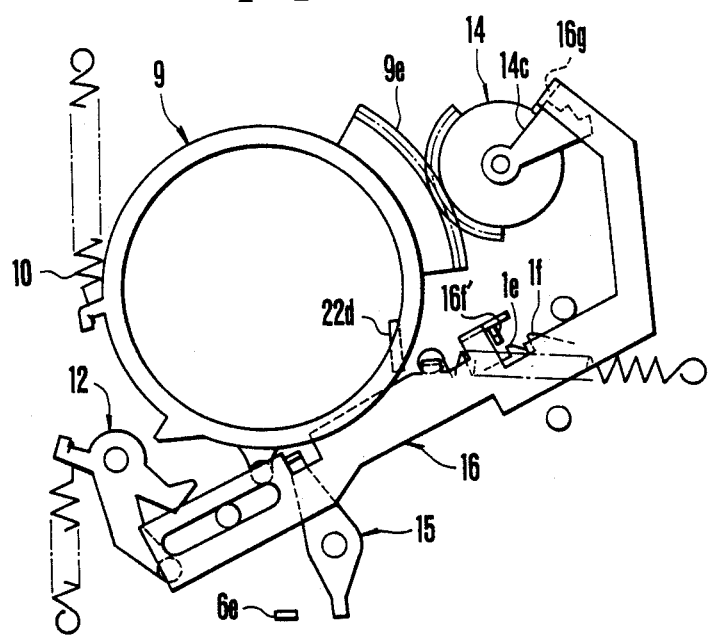

The set plate 6 travels further from the condition as shown in FIG. 5. The left end of the plate 6 then comes to abut on the driving pin 12c of the stop pawl 12 and thus causes the stop pawl 12 to turn clockwise. The claw 12b of the stop pawl 12 is disengaged from the claw part 9c of the distance ring 9 to allow the distance ring 9 to be turned clockwise by the force of the spring 10. The stop wheel 14 which is gear connected to the distance ring 9 then turns counterclockwise. The far distance claw 14c of the stop wheel 14 then hooks the bent up part 16g of the distance control lever 16 to cause the lever 16 to turn counterclockwise until the upper part 16c of the lever comes to abut on the pin 20c of the movable lever 20 and thus to bring the lever to a stop in a position as shown in FIG. 6. Under this condition, therefore, the photo-taking lens barrel 11 is drawn out by the cam part 9f of the distance ring 9 and is set in a far distance position. Further, under the condition shown in FIG. 6, the bent up part 16f' of the distance control lever 16 is disengaged from the claw 1e of the rotor 1 by the above-stated counterclockwise turn of the distance control lever 16.

When the set plate 6 travels further leftward from the condition shown in FIG. 6, a rotor energization signal is produced by a contact piece (not shown) and is supplied to the IC. The rotor 1 then turns clockwise as viewed on the drawing against the force of the spring 2. The brake part 1d of the rotor 1 comes to abut on the bent up part 6b of the set plate 6. This causes the rotor 1 to further turn clockwise following the travel of the set plate 6. However, the shutter blades 4 and 5 do not begin to open as yet at the point of time when the rotor 1 comes to abut on the set plate 6. Then, the set plate 6 further travels and the blade driving pin 3 of the rotor 1 causes the shutter blades 4 and 5 to open. Photometric means which is known and includes the photo-sensitive element 26 detects a correct value of exposure of film to light. After the detection of the correct exposure value, the power supply to the rotor 1 is cut off. The force of the spring 2 then causes the rotor 1 to turn counterclockwise. The shutter blades 4 and 5 come to close.

The set plate 6 continues to travel until a winding motor power supply switch (not shown) is shifted to a motor power supply position thereof.

With the winding motor power supply switch thus operated, a winding motor which is incorporated in the camera winds up a one frame portion of film via a known winding up mechanism and, at the same time, charges the set plate 6 and the distance ring 9 to bring about the same condition as shown in FIGS. 3 and 4.

Figure 7:
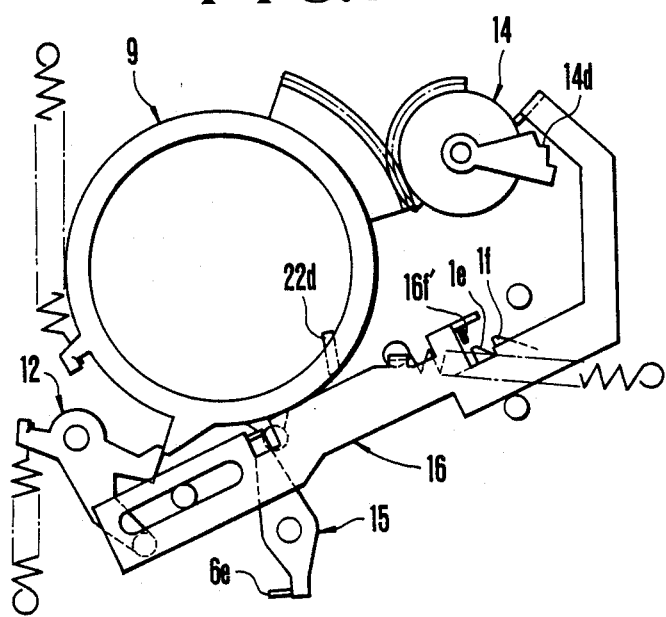
Figure 8:
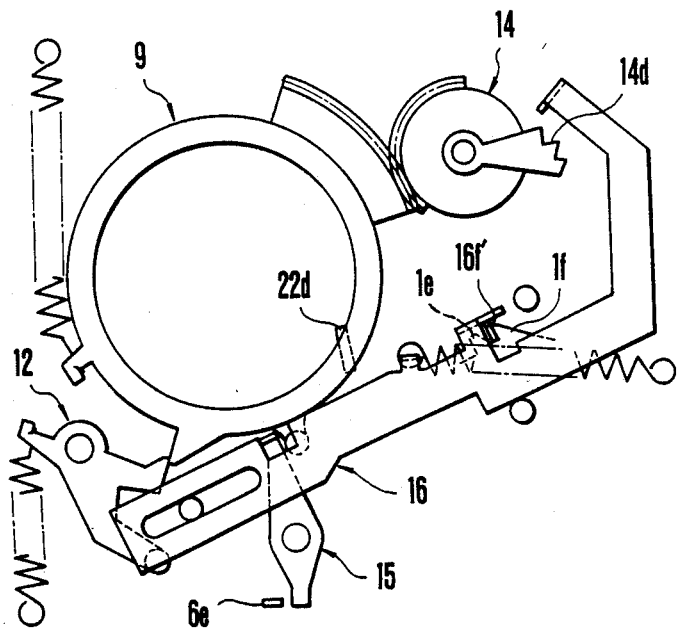

In case that the object to be photographed is located at a medium distance, when the shutter release button is depressed with the camera in the charged condition as shown in FIG. 4, the distance to the object is stored at the IC of the camera in the same manner as in the case of the far distance described in the foregoing. Following that, the set plate 6 is unlocked and is allowed to begin to travel. The contact piece of the set plate 6 slides over the circuit pattern and the start signal is supplied to the IC. Upon receipt of the above-stated distance signal and the start signal, the IC immediately produces the rotor energization signal to cause known circuit means to effect power supply to the rotor 1. The rotor 1 then turns clockwise until the control part 1d thereof comes to abut on the bent up part 6b of the set plate 6. At this instant, the bent up part 16f' is located above the claw 1e of the rotor 1 a little away from the claw as shown in FIG. 7. Under this condition, the distance control lever 16 obliquely slides upward to the right as viewed on the drawing according as the set plate 6 travels. When the bent up part 16f' passes over the claw 1e of the rotor 1, an intermediate signal is produced from the circuit pattern over which the contact piece of the set plate 6 is sliding and is supplied to the IC. Then, the IC produces a rotor power supply cutoff signal according to the above-stated distance signal and the intermediate signal. Power supply to the rotor 1 is then cut off by known circuit means. The rotor 1 is brought back to its original position by the force of the spring 2. After that, the bent up part 16f' of the distance control lever 16 which is further sliding obliquely upward to the right comes to engage the claw 1f of the rotor 1 to bring about a condition as shown in FIG. 8.

Figure 9:
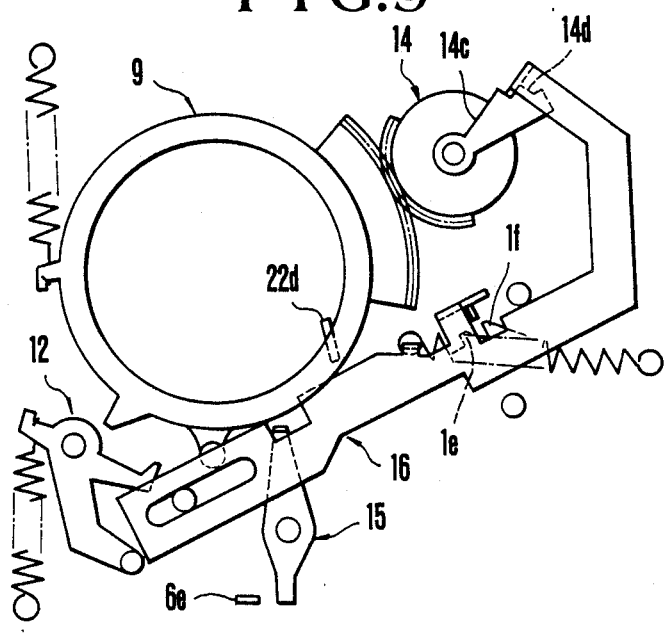
Figure 10:
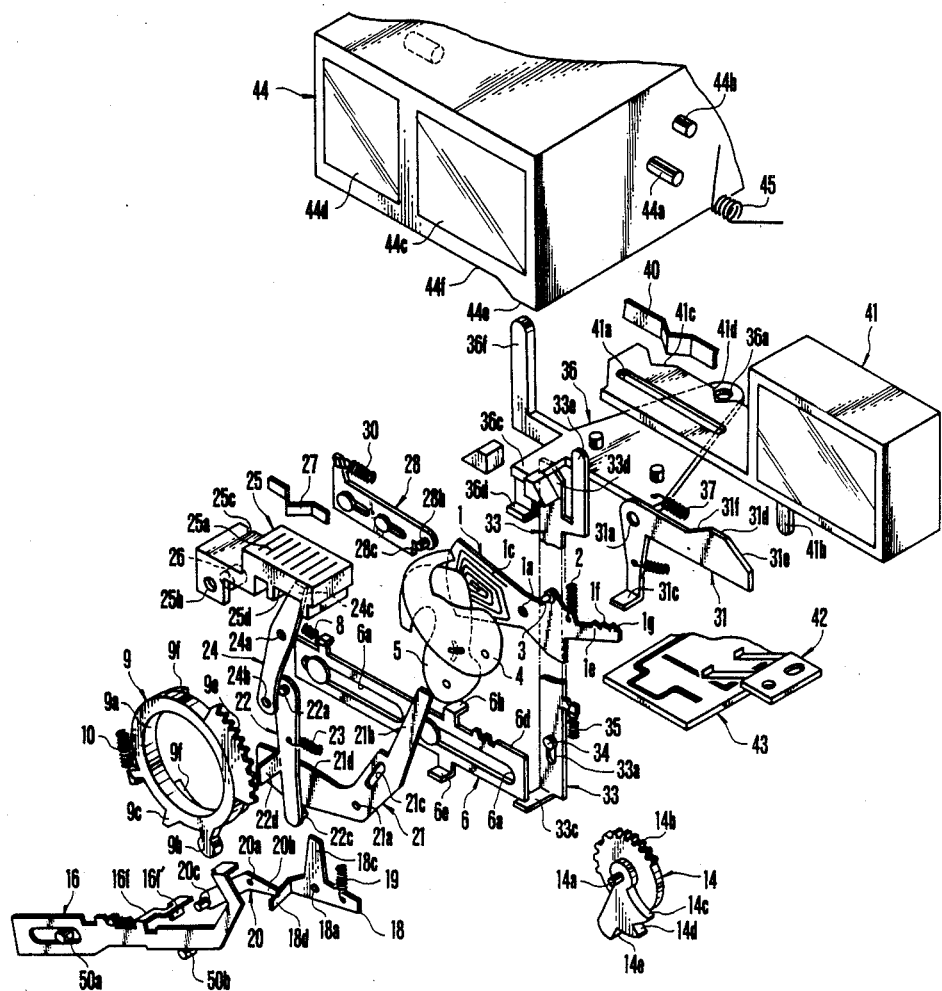
FIG. 10 is an exploded oblique view showing the essential parts of the internal mechanism of the embodiment as in a flash photographing state under the condition of a normal photographing mode.

The set plate 6 further travels to cause the stop pawl 12 to turn clockwise in the same manner as in the case of the far object distance described in the foregoing. This disengages the stop pawl 12 from the distance ring 9. Then, the distance ring 9 turns to cause the stop wheel 14 to turn counterclockwise. The medium distance claw 14d of the stop wheel 14 then hooks the bent up part 16g of the distance control lever 16 to cause thereby the lever 16 to turn counterclockwise on the shaft 50a and to come to a stop in a position as shown in FIG. 9. Then, the distance ring 9 sets the photo-taking lens barrel 11 in a medium distance position. After that, an exposure effecting operation is performed in the same manner as in the case of the far distance described in the foregoing. Upon completion of the exposure, the embodiment comes back to the charged state of FIG. 3.

If the object to be photographed is located at a near distance, the bent up part 16f' of the distance control lever 16 comes to abut on the claw 1g of the rotor 1 with the shutter release operation performed. The bent up part 16g of the distance control lever 16 then comes to engage the near distance claw 14e of the stop wheel 14.

Other processes of operation are identical with those of the above-stated cases of far and medium distances.

Figure 17A:
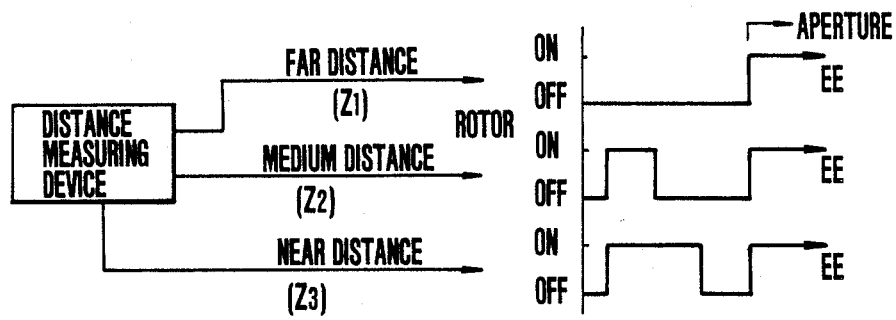

The timing for effecting power supply to the rotor for each of these different object distances is as shown in FIG. 17(a).

Switch-over to the flash photographing mode and the operation of the embodiment in that mode are as follows: When the flash device frame body 41 is moved from the position of the normal photographing mode shown in FIGS. 1 and 3 by pushing it to the right as viewed on the drawing with a finger applied to the upper part of the frame body the click groove 41d of the frame body 41 disengages from the click spring 40. The guide slot 41a slides on the shafts 36e. The left end of the guide slot 41a comes to abut on the left shaft 36e. At that instant, the click spring 40 engages the click groove 41c. Then, since the protrudent part 41b of the flash device frame body 41 which has been abutting on the higher cam edge part of the flash device detecting lever 31 moves toward the lower cam edge part 31e which is located on the right hand side. Therefore, the force of the spring 32 causes the flash device detecting lever 31 to turn counterclockwise. The FA lever 21 which has been abutting on the bent up part 31c of the lever 31 is also caused to turn clockwise by the force of the spring 23 which is exerted via the distance signal lever 22. The FA lever 21 comes to a stop with the bent up part 22d of the distance signal lever 22 coming to abut on the bent up part 16f of the distance control lever 16. Meanwhile, with the position of the flash device frame body 41 shifted, the charging contact piece (not shown) closes. An electric charge is supplied from a power source to the main flashing capacitor. Concurrently with that, the contact part 42 informs the IC that the camera has become the flash photographing mode.

Figure 17B:
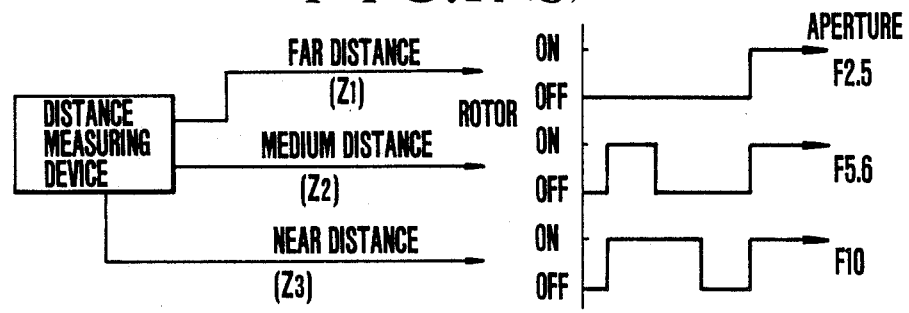
FIG. 17(b) the power supply timing for flash photography in the normal photographing mode.
Figure 17C:
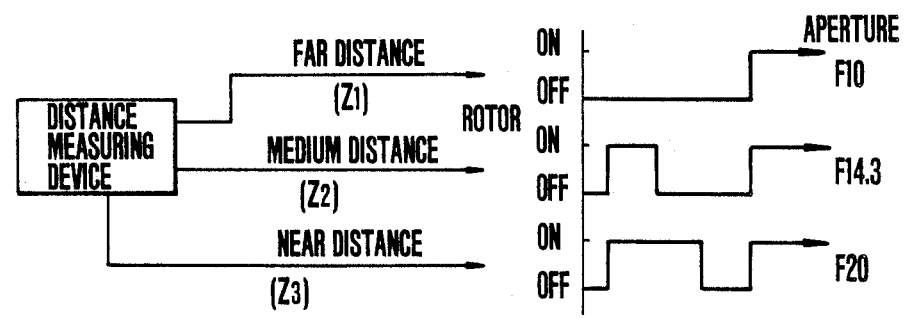
FIG. 17(c) the timing in the close-up photographing mode.

When the camera is directed to the object and the shutter release button is depressed under this condition, the distance measuring device measures a distance to the object in the same manner as in the case of the normal photographing mode. A distance signal thus obtained is stored at the IC. The set plate 6 is unlocked and beings to travel to the left. The contact piece provided on the set plate 6 slides over the circuit pattern to produce a start signal indicative of the start of the set plate. In association with the travel of the set plate 6, the distance control lever 16 also travels obliquely upward to the right. In accordance with the distance signal produced from the above-stated distance measuring device and the position signal produced from the set plate 6 indicative of the position of the distance control lever 16, power supply to the rotor 1 is turned on and off by the IC in a manner as shown in the timing chart of Fig. 17(b). The photo-taking lens barrel 11 is set in a drawn out position according to the object distance. In the case of the flash photographing mode, the bent up part 22d of the distance signal lever 22 is abutting on the bent up part 16f of the distance control lever 16 as mentioned in the foregoing. Therefore, in association with the oblique upward travel of the distance control lever 16, the distance signal lever 22 turns counterclockwise on the shaft 22a. Then, the FA lever 21 turns clockwise to bring the cam part 21d thereof into the locus of motion of the blade driving pin 3 of the rotor 1.

The distance control lever 16 has its stopping position vary with the object distance as mentioned in the foregoing description of the normal photographing mode. Therefore, the cam face of the cam part 21d of the FA lever 21 is arranged to vary the opening degree of the shutter blades to obtain an aperture value apposite to the guide number (G no.) of the flash device according to the stopping position of the distance control lever 16.

Accordingly, the FA lever 21 is stopped in a position by a stopping and setting action performed according to the object distance by the stop wheel 14 and the distance control lever 16. The set plate 6 further travels The rotor 1 is then energized to turn clockwise. The blade driving pin 3 of the rotor 1 opens the shutter blades 4 and 5 until it comes to abut on the cam part 21d of the FA lever 21. Then, the shutter blades 4 and 5 are kept in an opened state with the opening diameter determined in this manner. Following this, when the quantity of light measured by the photo-sensitive element 26 reaches an apposite exposure value for the film or after the lapse of a predetermined maximum shutter opening period of time even the apposite exposure value has not yet been attained, the IC of the camera produces a shutter closing signal. Then, power supply to the rotor 1 is cut off by known circuit means. At that instant, the flash tube of the flash device frame body 41 emits a flash light. With the diameter of the aperture of the shutter blades adjusted to the object distance in the same manner as in the case of the normal photographing mode before flashing by the flash device, an appropriate exposure can be performed without fail in the flash photographing mode.

Figure 12:
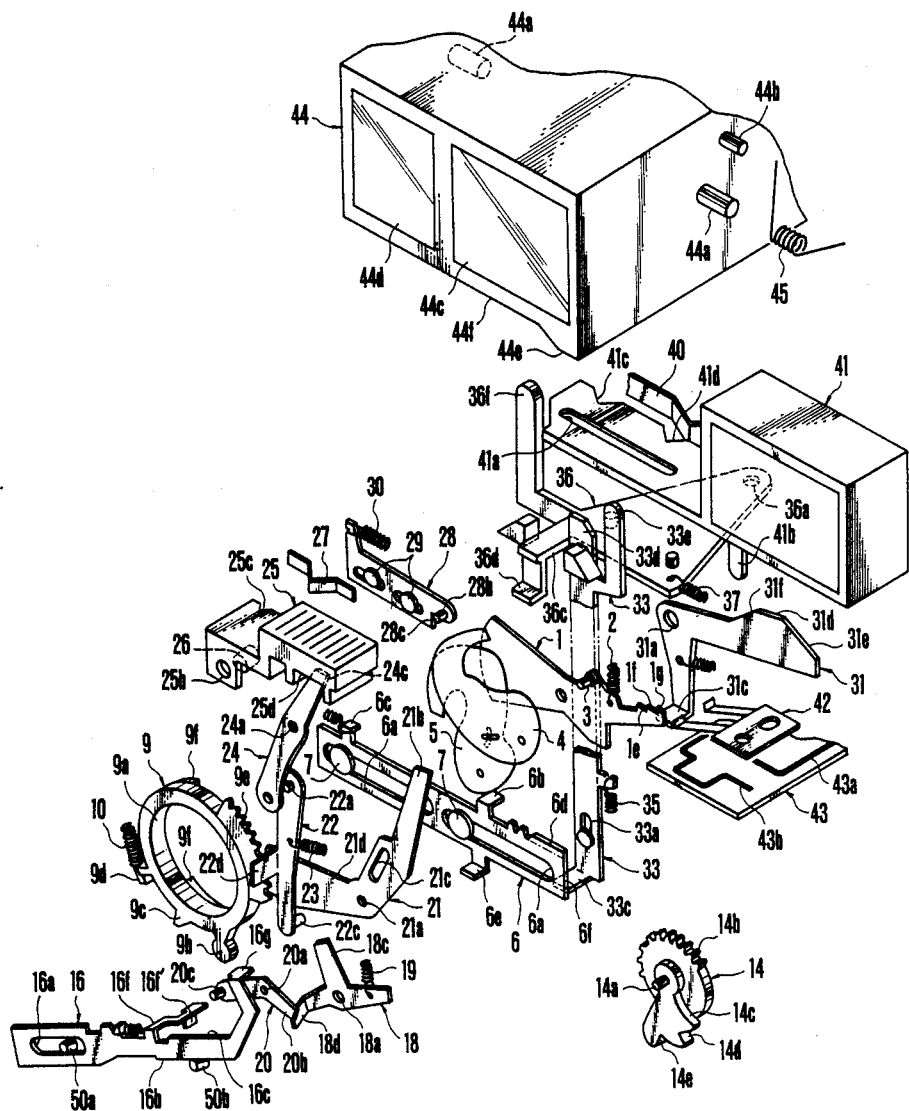
FIG. 12 is an exploded oblique view showing the essential parts of the internal mechanism of the embodiment as in the close-up photographing mode.

Swtich-over to the close-up photographing mode and the operation of the embodiment in that mode are as follows: To shift the camera from the normal photographing mode which is shown in FIGS. 1 and 3 to the close-up photographing mode which is shown in FIG. 12, the flash device frame body 41 is pushed to the left. The flash device frame body 41 then pushes the projection 36f of the flash device carrying plate 36 to cause it to turn clockwise on its hole 36a. The protrudent part 36c of the plate 36 then abuts on the stopper 39 to bring the plate 36 to a stop in that position. Then, the reset lever 33 has its fore end part 33d disengage from the protrudent part 36c and is thus allowed to be mover upward as viewed on the drawing by the force of the spring 19 of the close-up reset lever 18. This move of the reset lever 33 prevents the flash device carrying plate 36 from being turned counterclockwise by the force of the spring 37 toward its original position, Further, at that time, the flash device body 41 turns clockwise on the hold 36a together with the carrying plate 36 and thus shifts its illuminating direction to a direction suited for the close-up photography.

As a result of the clockwise turn of the flash device frame body 41, the contact face of the flash device detecting lever 31 contacting with the protrudent part 41b of the flash device frame body 41 shifts from the high cam edge part 31d to the low cam edge part 31f. The lever 31 thus turns counterclockwise to release thereby the FA lever 21 and the distance signal lever 22 from restriction in the same manner as in the case of the flash photographing mode described in the foregoing. Meanwhile, the clockwise turn of the flash device carrying plate 36 shifts the contacting position of its projection 36f with the cam part of the view finder block 44 from the cam part 44e to the lower cam part 44f. Therefore, the view finder block 44 is caused by the force of the spring 45 to turn on the shafts 44a in the counterclockwise direction, i.e. toward the optical axis of the photo-taking lens.

Figure 11A:
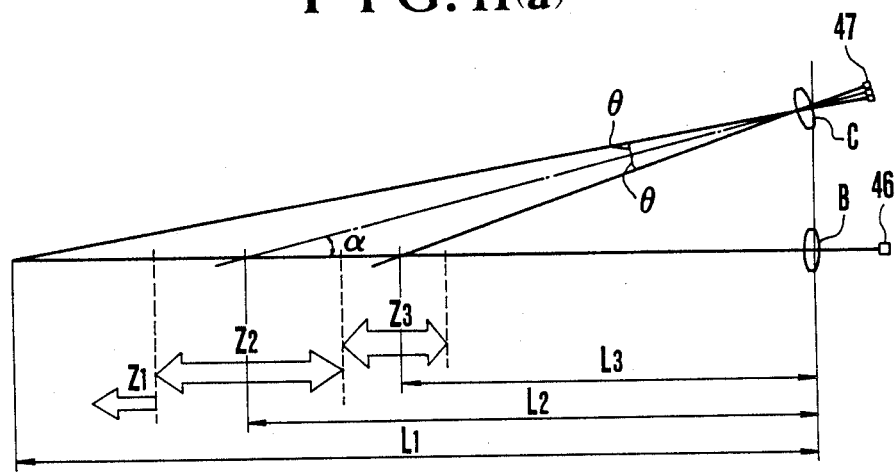
FIGS. 11 (a) and 11(b) are illustrations of the distance measuring zones of a distance measuring device which shifts the distance measuring zones from one to another in response to the switch-over of one photographing mode to the other, FIG. 11(a) showing the zones for the normal photographing mode and FIG. 11 (b) the zones for the close-up photographing mode.
Figure 11B:
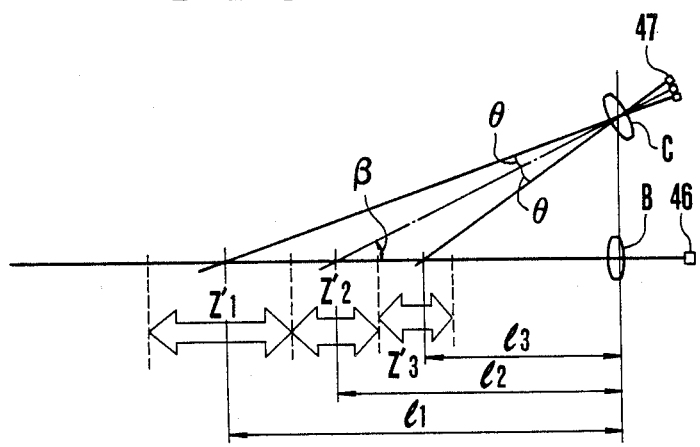

The distance measuring system of this embodiment employs a trigonometrical measurement method and is arranged as shown in Figs. 11(a) and 11(b). A light flux from a light projecting element 46 is imaged on an object by means of a light projecting lens B. A reflection light flux thus obtained from the object is imaged on a photosensitive element 47 by means of a light receiving lens C. In the normal photographing mode which is shown in Fig. 11(a), the distance measuring zone is divided into a far distance zone Z1, medium distance zone Z2 and a near distance zone Z3 with distances L1, L2 and L3 used as reference distances for these zones respectively. However, when the photographing mode is shifted to the close-up photographing mode with the view finder block 44 turned, that is, with the photo-sensitive element 47 turned, the distance measuring zone is divided into different zones including a far distance zone Z'1, a medium distance zone Z'2 and a near distance zone Z'3 with different distances l1, l2 and l3 used as references as shown in Fig. 11(). Of these divided zones, the far distance zone Z'1 is arranged to overlap the near distance zone Z3 of the normal photographing mode. In this instance, it is of course possible to have the light projecting element to be turned in place of the light receiving photo-sensitive element. Further, the view finder visual field is also shifted for the near distance correction to the same extent as the distance measuring system. Meanwhile, the flash device frame body 41 is also turned clockwise on the hole 36a of the flash device carrying plate 36 as mentioned in the foregoing to such a degree that coincides with the near distance correction degree of the light emitting direction of the flash device.

The upward movement of the reset lever 33, i.e. the counterclockwise turn of the close-up reset lever 18 is arranged to be such that, as shown in FIG. 12, the movable lever 20 is released from restriction to be turnable clockwise further from the position of FIG. 3 to a predetermined degree. Then, since the position of the pin 20c of the movable lever 20 shifts upward, the distance control lever 16 becomes movable upward accordingly. As a result, the turning degree of the distance ring 9, that is, the drawing out extent of the photo-taking lens is shifted to the near distance side to a greater extent than in the case of the normal photographing mode.

Further, the upward move of the reset lever 33 causes the display part 33e thereof to protrude outside of the camera to inform the photographer of the shift of the camera to the close-up photographing mode as shown in FIG. 2. In addition to this, it enables the photographer to bring the camera back to the normal photographing mode by pushing this display part 33e inwards against the force of the spring 19. With the display part 33e thus pushed in, the fore end part 33d of the reset lever 33 disengages the projection 36c of the flash device carrying plate 36 to allow the plate 36 to be turned counterclockwise by the force of the spring 37 back to its position of the normal photographing mode as shown in FIG. 3.

When the flash device frame body 41 is slidden for the close-up photographing mode, the contact piece 42b of the contact part 42 slides over the patterns 43a and 43b of the circuit substrate 43. This informs the IC of the switch-over to the flash photographing mode and at the same time also causes the main flashing capacitor to be charged. Meanwhile, the bent up part 36d of the flash device carrying plate 36 abuts on the stepped part 28c of the close-up photographing lever 28 to slide it to the left against the force of the spring 30. The shaft 28b of the close-up photographing lever 28 then causes the ISO (film sensitivity value) shifting lever 24 to turn clockwise approximately on the end part of the arm part 24c. This causes the position of the hole 24b which serves as an ISO (film sensitivity value) signal output part to shift to the left as viewed on FIG. 12. Therefore, the distance signal lever 22 which has its one end shaft 22a fitted in the hole 24b turns counterclockwise as viewed on the drawing approximately on its bent up part 22d which is abutting on the bent up part 16f of the distance control lever 16. As a result, the pin 22c of the distance signal lever 22 moves to the right as viewed on the drawing to cause thereby the FA lever 21 which is fitted thereon to turn clockwise. Then, the cam part 21d which abuts on the shutter blade driving pin 3 of the rotor 1 moves in such a way as to have the aperture formed by the shutter blades 4 and 5 stopped down further than in the case of the flash photographing mode.

Figure 13:
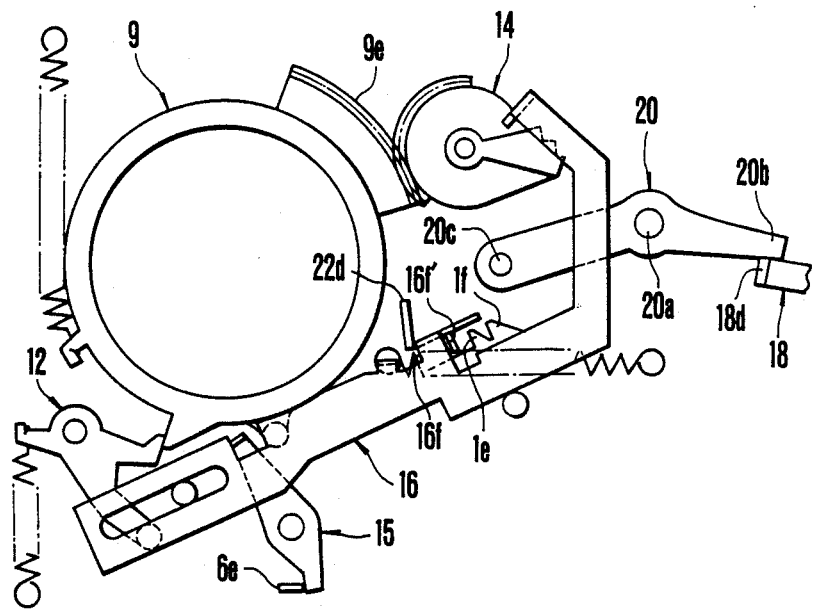
FIGS. 13 through 16 illustrate the operation of the focus adjusting part of the internal mechanism of FIG. 12, FIG. 13 showing it as in a charged state.

Under the setting condition described above, when the camera is directed to a photographing object located at a close-up distance and the shutter release button is pushed with the camera in the charged state as shown in FIG. 13, the distance measuring device performs a distance measuring operation in the same manner as in the normal photographing mode. Following that, the set plate 6 is unlocked and is allowed to begin to travel. Then, the bent up part 22d of the distance signal lever 22 moves to the right following the travel of the bent up part 16f of the distance control lever 16.

Figure 14:
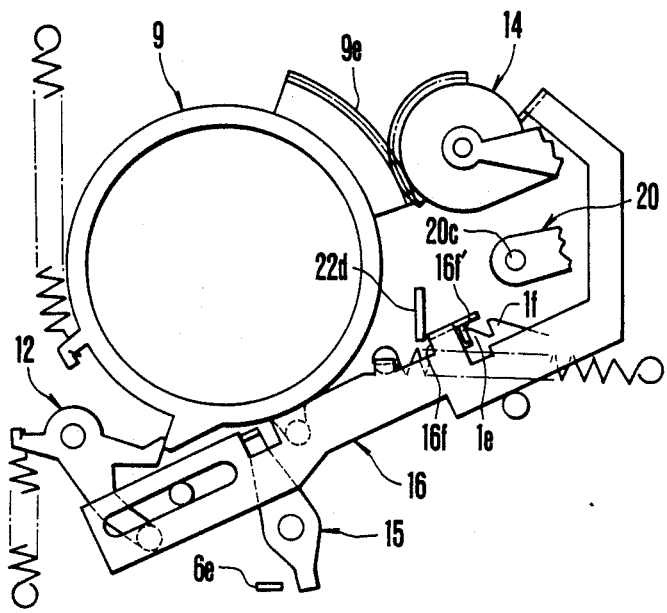
Figure 15:
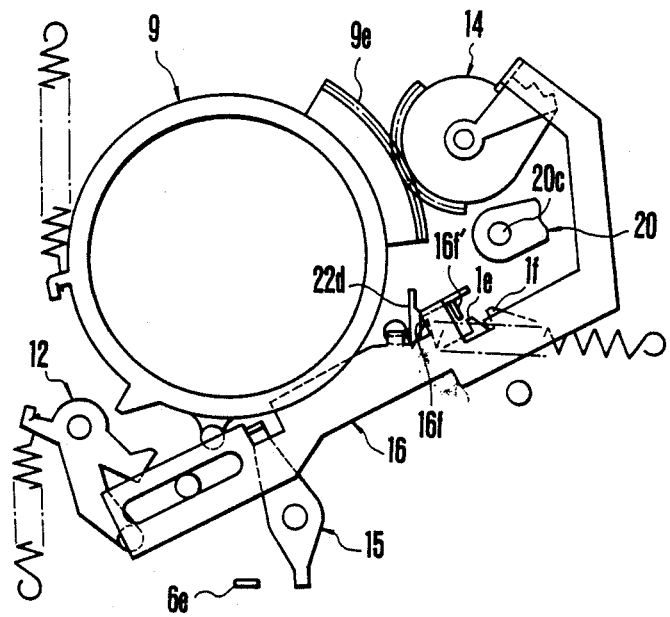
Figure 16:
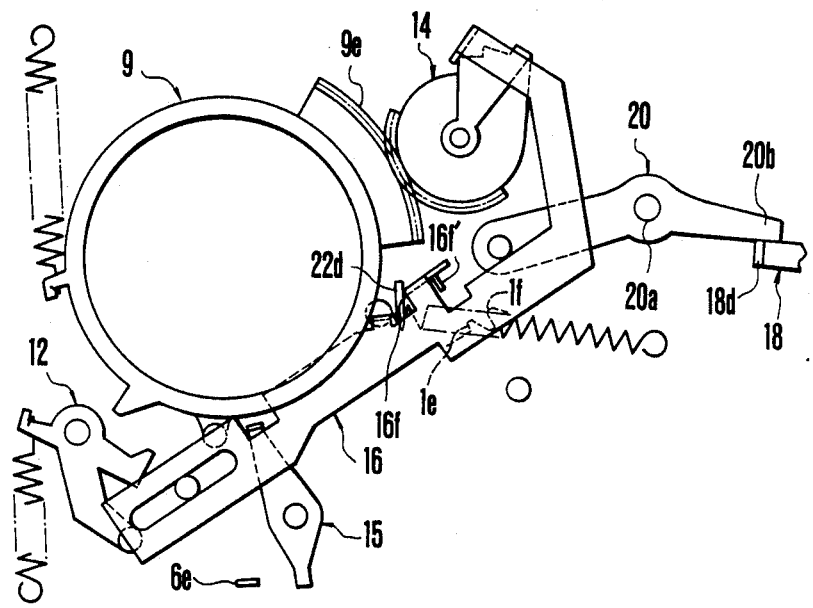

In case that the photographing object is located within the zone Z'1 as shown in FIG. 11(b). that is in case where it is within a relatively far zone among the close-up photographing zones which are set nearer than for the normal photographing mode, an angle α relative to the base line B-C is mechanically corrected into an angle β in the event of the close-up photographing mode. Therefore, in that event, the distance measuring device of the camera receives a distance measurement signal which appears as if the object is located at a far distance. Accordingly, the focus adjusting part of the camera operates in the same manner as in the case of having an object located at a far distance under the condition of the normal photographing mode. In other words, the rotor 1 is not energized even with the start signal of the set plate 6 supplied to the IC. Therefore, the bent up part 16f of the distance control lever 16 and the far distance claw 1e of the rotor 1 abut on each other to cause the distance control lever 16 to come to a stop in a state as shown in FIG. 14. After that, the set plate 6 further travels to disengage the distance ring 9 and the stop pawl 12 from each other. This allows the distance ring 9 to be turned counterclockwise by the force of the spring 10. The stop wheel 14 which is gear connected to it comes to turn counterclockwise. Then, the claw 14c of the stop wheel provided for a far distance hooks the bent up part 16g of the distance control lever 16 to cause the lever 16 to turn counterclockwise on the shaft 502. This disengages the bent up part 16f of the lever 16 from the claw 1e of the rotor 1 as shown in FIG. 15. The distance control lever 16 further turns until it comes to a stop by abutting on the pin 20c of the movable lever 20 as shown in FIG. 16. Then, the photo-taking lens is stopped from being drawn out.

The moving extent of the above-stated pin 20c is predetermined in such a manner that the drawn out position of the photo-taking lens in this instance becomes a close-up photographing position within the range as shown in FIG. 11 (b).

After that, the set plate 6 continues to travel A rotor energizing signal is produced to the IC. The rotor turns clockwise. The shutter blades 4 and 5 open. The blade driving pin 3 comes to abut on the cam part 21d of the FA lever 21 to stop the shutter blades from opening further and the film is exposed to light. Then, the abutting position in this instance is arranged to cause an aperture to be smaller than the aperture for the above-stated flash photographing mode by the extent to which the close-up lever 28 has shifted to the left as mentioned above, that is, by the extent to which the FA lever 21 has turned clockwise. This arrangement ensures an apposite exposure in the event of a flash photographing operation on an object located at a close-up distance. The camera then cuts off power supply to the rotor 1 in response to a cut off signal produced after the lapse of a preset shutter opening time. Then, concurrently with that, the flash device emits a flash of light and the shutter blades 4 and 5 close to terminate an exposure operation.

After completion of the exposure, the set plate further travels. The motor power supply switch is shifted to the motor power supply position thereof by known means. At the same time, the film winding mechanism is unlocked. The camera then winds up the film and charges the shutter and the photo-taking lens barrel operating system. At the end of the charging operation, the set plate 6 is in an over-charge position in which the end part 6f thereof engages the arm part 18c of the close-up reset lever 18. This engagement causes the close-up reset lever 18 to turn to a great degree in the clockwise direction against the force of the spring 19. As a result of this, the reset lever 33 is caused by the force of the spring 35 to slide downward and to disengage its fore end part 33d from the projection 36c of the flash device carrying plate 36. Therefore, the flash device carrying plate 36 is caused by the force of the spring 37 to turn counterclockwise to come back to the position for the normal photographing mode a shown in FIGS. 1 and 3. At that time, the view finder block 44, the flash device frame body 41 and the parts of the FA (automatic flashing) mechanism of course also come back to their positions for the normal photographing mode. Then, the above-stated step of over-charge comes to an end and the set plate 6 comes back to the charged and locked position to bring about the normal photographing mode shown in FIG. 3.

Figure 18:
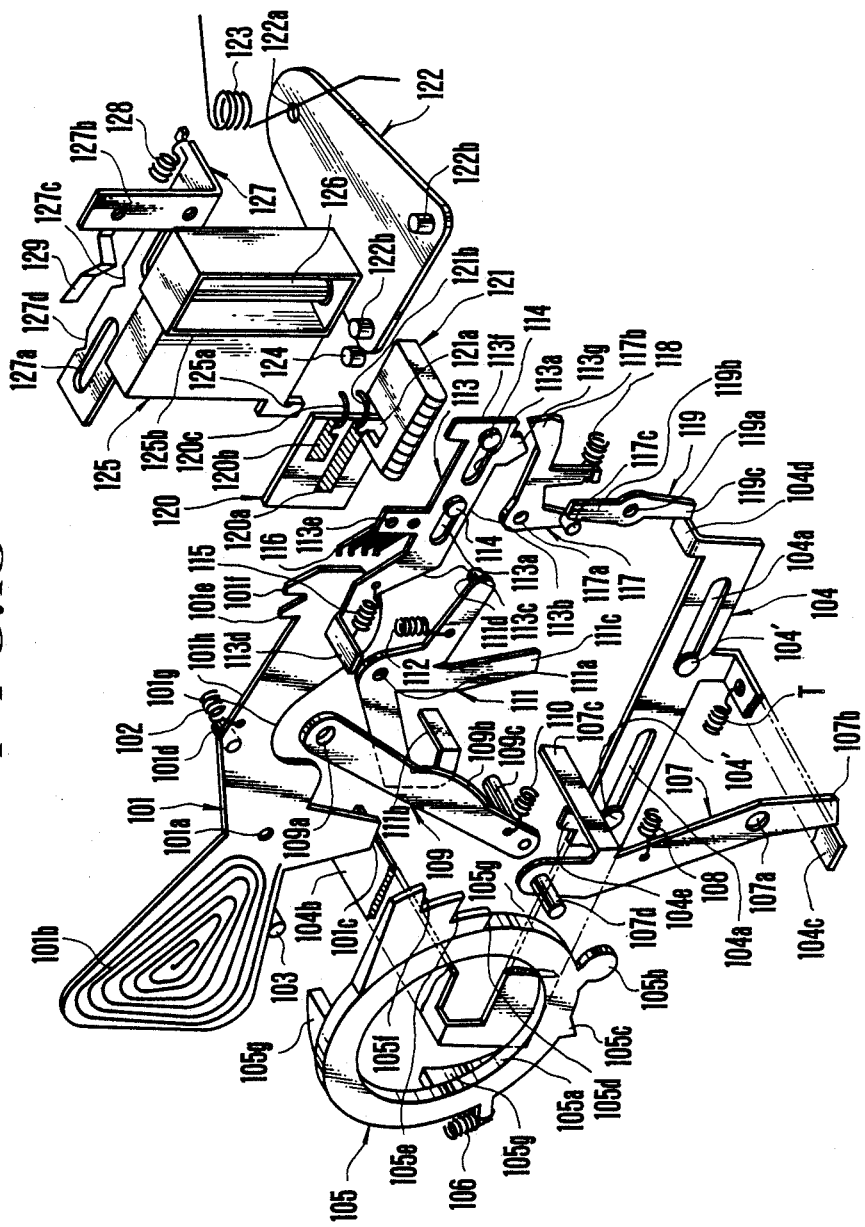
FIGS. 18 through 22 show the close-up photographing device of a arranged according to the invention as a second embodiment thereof.

FIG. 18 shows a close-up photographing device arranged as another embodiment of this invention. In this embodiment, a rotor 101 has a hole 101a pivotally fitted on a shaft protruding from a structural member of the camera. A spring 102 urges the rotor 101 to turn counterclockwise. Under the condition shown in FIG. 18, the rotor is abutting on a stopper 103 provided on the above-stated structural member. A coil pattern 101b is printed on the surface of the rotor. A magnet and a yoke (not shown) are disposed in front and in rear of the printed coil pattern at some distance therefrom. When the coil pattern is energized, a force is generated according to the Fleming's left-hand rule to turn the rotor 101 clockwise against the force of the spring 102. The rotor 101 is provided with a cam part 101c and a blade driving pin 101d. When the rotor 101 turns clockwise with the coil pattern 101b energized, the cam part 101c abuts on the bent up part 104b of a set plate 104. The cam part 101c is arranged such that, when the set plate 104 moves to some extent from its position as shown in FIG. 18, the cam edge of the cam part prevents the rotating degree of the rotor 101 from suddenly increasing. The blade driving pin 101 fittingly engages shutter blades (not shown) and is arranged to open and close them according as the rotor 101 turns. The rotor 101 is further provided with an automatic focusing control claws 101e and 101f which are formed at an upper edge part 101h on the side opposite to the coil pattern 101b and an automatic flashing (FA) cam part 101g which is formed along the lower edge of the rotor 101. The claws 101e and 101f are arranged to engage the bent up part 107c of an automatic focusing (AF) control lever 107 when they are in the positions as shown in FIG. 18. With the coil pattern 101b of the rotor 101 energized, when the rotor 101 turns clockwise from the condition of FIG. 18 until its cam part 101c comes to abut on the bent up part 104b of the set plate 104, these claws 101e and 101f come outside the locus of motion of the bent up part 107c of the AF control lever 107. The FA (automatic flashing) cam part 101g is arranged to abut on the pin 109c of the automatic flashing (FA) operation lever 109 when the position of the pin 109c shifts according to each of adjusted distances in the flash photographing mode. With the FA cam part 101g thus abutting on the pin 109c, the aperture diameter of the shutter blades (not shown) is adjusted to an aperture suited to the object distance.

The above-stated set plate 104 has its slot 104a fitted on a pin 104' provided on the above-stated structural member and is slidably carried thereby to be movable to the left or right as viewed on the drawing. A spring T is arranged to urge the set plate 104 to move to the left at a constant speed by virtue of a governor mechanism. However, a winding and charging mechanism (not shown) slides the set plate 104 to the right against the force of the spring T. As a result, the set plate 104 is locked in the charged position of FIG. 1 by means of a locking member (not shown). The set plate 104 is provided with bent up parts 104c and 104d and an arm part 104e in addition to the above-stated bent up part 104b.

Figure 19:
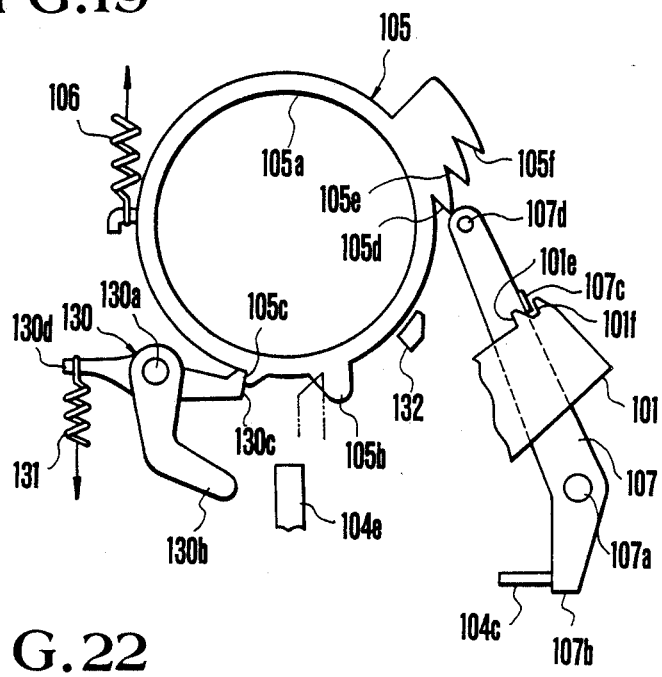

A distance ring 105 has its inner diameter part 105a rotatably fitted on a tubular part of the above-stated structural member. A spring 106 is arranged to urge the distance ring 105 to turn clockwise. On the outer circumferential part of the distance ring 105 are arranged a charging protrudent part 105b, a claw part 105c and claw teeth 105d, 105e and 105f which are provided for far, medium and near distances respectively. When a charging member (not shown) pushes the charging protrudent part 105b to cause the ring 105 to turn counterclockwise against the force of the spring 106, the claw part 105c engages the claw part 130c of a stop pawl 130 which will be described later herein and the distance ring 105 comes to the charged position and is locked there as shown in FIG. 19. Further, the ring 105 is provided with three drawing out cam parts 105g which are evenly spaced along the circumference of the ring on the rear side thereof. A part of a lens barrel (not shown) is abutting on the cam part 105g. A photo-taking lens is thus arranged to be drawn out according as the distance ring 105 turns clockwise.

The above-stated AF control lever 107 is pivotally carried by the above-stated structural member via a hole 107a provided therein. A spring 108 is arranged to urge the AF control lever 107 to turn clockwise as viewed on FIG. 18.

Figure 20:
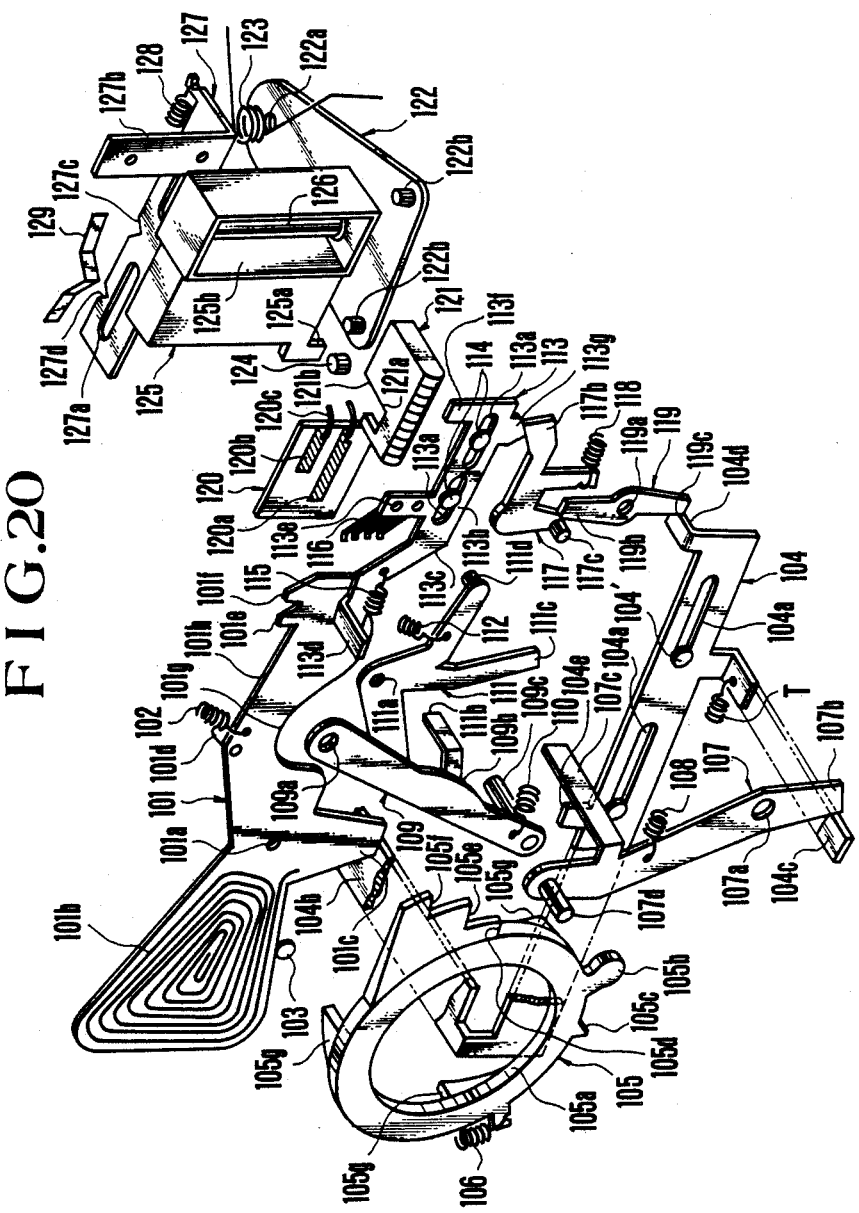
Figure 21:
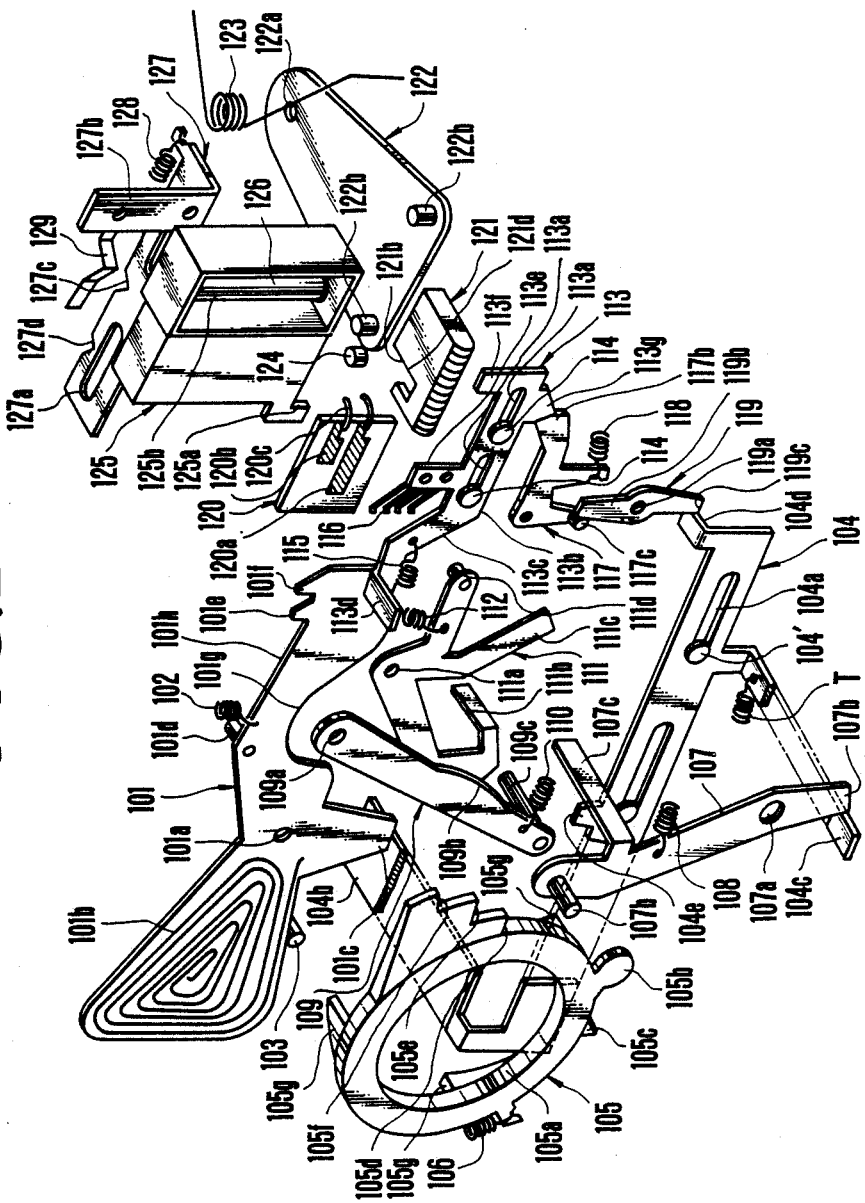

Under the charged condition, one end part 107b of the AF control lever 107 is abutting on the bent up part 104c of the set plate 104 to have the lever 107 locked in the position as shown in FIG. 18. On the side of the other end of the lever 107 are provided the above-stated bent up part 107c and a pin 107d. During the process of the clockwise turning motion of the AF control lever 107 which takes place according as the set plate 104 travels leftwards, the bent up part 107c comes to abut on the above-stated claw 101e or 101f of the rotor 101. Then, the pin 107d engages one of the claw teeth 105d, 105e and 105f to bring the clockwise turning motion of the distance ring 105 to a stop. The above-stated FA operation lever 109 is pivotally carried through its hole 109a by an ISO film sensitivity change-over lever (not shown). A spring 110 is arranged to urge the lever 109 to turn counterclockwise as viewed on the drawing. The lever 109 is provided with a cam part 109b formed along one side edge and the above-stated pin 109c disposed at one end. Under the condition of the normal photographing mode as shown in FIG. 18, the bent up part 113d of a mode switch-over lever 113 abuts on the lever 109 and the pin 109c does not abut on the cam part 101g even when the rotor 101 turns clockwise. In the event of the flash photographing mode as shown in FIG. 20 and the close-up photographing mode as shown in FIG. 21, the cam part 109b of the FA operation lever 109 engages the bent up part 107c of the AF control lever 107. Then, in accordance with variations in the position of the AF control lever 107, the turning degree of the FA operation lever 109 varies to change its abutting surface between the pin 109c and the cam part 101 of the rotor 101 in such a way as to control the turning degree of the rotor 101. With the turning degree of the rotor 101 thus controlled, the shutter blades is stopped from opening at an aperture diameter suited for the object distance. These parts are thus arranged to form a so-called automatic flashing mechanism.

A reference numeral 111 denotes a restriction lever which is pivotally carried through its hole 11a by a structural member (not shown). A spring 112 is arranged to urge the restriction lever 111 to turn counterclockwise as viewed on FIG. 18. The restriction lever 111 is provided with a bent up part 111b, an arm part 111c for stopping the AF control lever and a pin 111d. In the event of the close-up photographing mode as shown in FIG. 21, the bent up part 111b of the restriction lever 111 engages the upper edge 101h of the rotor 101 to allow the rotor 101 to be turned clockwise by the force of the spring 112. The restriction lever 111 is thus arranged to allow the rotor 101 to come to a position where the claws 101e and 101f never engage the bent up part 107c of the AF control lever 107 when the AF control lever 107 turns after a shutter release operation. In the case of the normal photographing mode shown in FIG. 18, when the rotor 101 turns clockwise with a shutter release operation performed and with the rotor 101 energized according to a distance measurement signal, the arm part 111c of the restriction lever 111 serves as stopper if the bent up part 107c of the AF control lever 107 does not engage the claw 101e or 101f of the rotor 101. In that instance, the pin 107d of the AF control lever 107 comes to engage the claw tooth 105f of the distance ring 105. However, under the condition of the close-up photographing mode shown in FIG. 21, the position of the arm part 111c of the restriction lever 111 is shifted by the counterclockwise turn of the lever 111. Therefore, if the bent up part 107c of the AF control lever 107 does not engage the claw 101e or 101f of the rotor 101 as mentioned above, the AF control lever 107 further turns clockwise. After that, even when the distance ring 105 turns, the claw tooth 105f of the ring 105 does not engage the pin 107d of the AF control lever 107. Therefore, the distance ring 105 is allowed to turn further. Then, the photo-taking lens is further drawn out until the ring comes to abut on a stopper 132 which is shown in FIG. 19. Further, the above-stated pin 111d is arranged to abut on the bottom face 113b and the slanting face part 113c of the mode switch-over lever 113. The restriction lever 111 turns according to the shifting position of the mode switch-over lever 113 and the operation mode of the camera is thus switched over from one mode to another.

The mode switch-over lever 113 is slidably carried by pins 114 which are fitted in slots 113a of the lever 113 and is arranged to be slidable to the left or right as view on the drawing. A spring 115 is arranged to urge the mode switch-over lever 113 to move to the left. The lever 113 is provided with a bottom face part 113b and a slanting face part 113c which are formed along the lower edge of the lever 113; and the above-stated bent up part 113d which is formed at the left end part of the lever. In the normal photographing mode shown in FIG. 18 and also in the flash photographing mode which is shown in FIG. 20, the bottom face part 113b abuts on the pin 111d of the above-stated restriction lever 111. In the close-up photographing mode which is shown in FIG. 21, the slanting face part 113c engages the pin 111d and thus keeps the restriction lever 111 in a state of having turned counterclockwise. In the normal photographing mode shown in FIG. 18, the bent up part 113d abuts on the FA operation lever 109 to turn the lever 109 clockwise and keeps it in that position. However, in the flash photographing mode of FIG. 20 and the close-up photographing mode of FIG. 21, the bent up part 113d moves away from the FA operation lever 109 as mentioned above. The mode switch-over lever 113 is further provided with a contact piece carrying part 113e and a projection 113f which are formed on the upper edge side of the lever 113 and a clicking protrudent part 113g which is formed at the right end on the lower edge side. The contact piece carrying part 113e has a contact piece 116 for a flash device caulked and secured thereto. The projection 113f is fitted into a slot part 121a of a close-up photographing knob which will be described later. The mode switch-over lever 113 is thus arranged to slide to the left or right in response to the move of the close-up photographing knob 121 to the left or right as viewed on the drawing. The clicking protrduent part 113g is arranged to engage the rising part 117b of a click lever 117 which will be described below:

The click lever 117 is pivotally carried through a hole 117a by the above-stated structural member. A spring 118 is arranged to urge the lever 117 to turn counterclockwise. The above-stated rising part 117b is formed on one arm part while a pin 117c is provided on another arm part. When the mode switch-over lever 113 is slidden to the right, the protrudent part 113g of the lever 113 engages the rising part 117b to cause the click lever 117 to turn clockwise against the force of the spring 118. This arrangement clearly gives an operating feeling to the photographer. In addition to this clicking arrangement, the clicking lever 117 also serves to keep the mode switch-over lever 113 in a close-up photographing position when the close-up photographing mode is selected as shown in FIG. 21. The pin 117c is arranged to abut on one end 119b of a close-up reset lever 119.

The close-up reset lever 119 is pivotally carried through a hole 119a by the above-stated structural member. While the pin 117c of the click lever 117 abuts on one end 119b of the lever 119, the other end part 119c of the close-up reset lever 119 abuts on the bent up part 104d of the set plate 104. When the set plate 104 is in the overcharge state, the end part 119c slides further rightward from the state of FIG. 18 to have the close-up reset lever 119 turn counterclockwise.

The embodiment includes a print-circuit board 120 for a flash device which has a grounding pattern 120a and a power supply pattern 120b. Lead wires 120c are connected respectively to these patterns. The print-circuit board 120 is arranged to be able to come into contact with the contact piece 116 attached to the mode switch-over lever 113.

The close-up knob 121 which is mentioned in the foregoing is slidably carried by the cover of the camera (not shown). The slot part 121a of the knob 121 has the projection 113f of the mode switch-over lever 113 fitted therein as mentioned in the foregoing. Meanwhile, a bent down part 25a of a flash device frame body 125 which will be described later is arranged to fittingly engage the right end face of the slot part 121a. A flash device carrying plate 122 is pivotally carried through a hole 122a by the upper surface of a structural member (not shown). A spring 123 is arranged to urge the plate 122 to turn clockwise as viewed on the drawing. Normally, as shown in FIG. 18, the flash device carrying plate 122 abuts on a stopper 124 which is provided on the structural member. The plate 122 is provided with a pair of shafts 122b which fittingly engage a pair of guide slots 127a provided in a guide plate 127 which is coupled with the flash device frame body 125 in one unified body therewith. The flash device frame body 125 has its bent down part 125a engaging the end face 121b of the slot part 121a of the close-up photographing knob 121 as mentioned above. Within the flash device frame body 125 is disposed a xenon tube 126 which is arranged in front of a reflection surface 125b. The above-stated guide plate 127 is coupled in one unified body with the flash device frame body 125 by means of a bent up piece 127b in a known manner. The guide slots 127a of the plate 127 fittingly engage the shafts 122b of the flash device carrying plate 122 to permit it to slide to the left or right as mentioned above. A spring 128 is arranged to urge the guide plate to move to the left. The plate 127 is provided with click grooves 127c and 127d which are formed along the rear edge part of the plate 127 to engage a click spring 129. Under the condition as shown in FIG. 18, the click spring 129 is engaging the clock groove 127c while the right end parts of the guide slots 127a engage the shafts 122b of the flash device carrying plate 122 and the guide plate 127 is in repose.

Referring to FIG. 19, the above-stated stop pawl 130 is pivotally carried through a shaft 130a by a structural member (not shown). A spring 131 is hooked on a spring peg part 130d and is thus arranged to urge the stop pawl 130 to turn clockwise as viewed on the drawing. Under the charged condition as shown in FIG. 19, the claw part 130c of the stop pawl 130 engages the claw part 105c of the distance ring 105 as mentioned in the foregoing to stop the clockwise turning motion of the distance ring 105. The arm part 130b of the stop pawl 130 is arranged to have the arm part 104e of the set plate 104 come to abut thereon when the set plate 104 travels to the left in response to a shutter release operation and thus to cause the stop pawl 130 to turn clockwise. The clockwise turn of the stop pawl 130 disengages its claw part 130c from the claw part 105c of the distance ring 105. Therefore, to make the turning timing of the distance ring 105 precise, the arm part 130b and the arm part 104e of the set plate 104 are precisely spaced.

A reference numeral 132 denotes a stopper which is provided for close-up photography and is attached to a structural member (not shown). In the event of the close-up photographing mode; this stopper 132 restricts the turning motion of the distance ring 105 by abutting on the claw tooth 105d of the distance ring 105.

Figure 22:
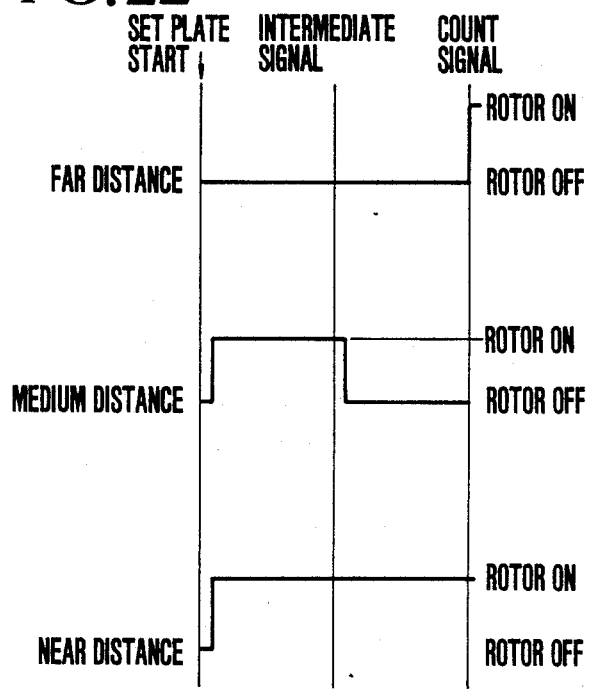

The embodiment which is arranged as described above operates as follows:

The operation of the embodiment in the normal photographing mode is first described. A winding and charging mechanism (not shown) causes the set plate 104 to slide to the right against the force of the spring. A locking member (not shown) locks the set plate 104 in the charged position as shown in FIG. 18. The distance ring 105 is, at the same time, caused to turn counterclockwise against the force of the spring 106. The claw part 105c of the distance ring 105 engages the claw part 130c of the stop pawl 130 to lock the ring in the charged position as shown in FIG. 19. Under this condition, when the photographer directs the camera toward an object to be photographed and pushes the shutter release button, a distance to the object is measured by known distance measuring means. The measured distance is stored at the IC of the camera. Following this, the set plate 104 is unlocked and is caused by the force of the spring to travel to the left at a constant speed under the control of the governor mechanism. In association with this, the AF control lever 107 turns clockwise. Then, in response to the start signal of the set plate 104, the IC begins to energize the coil pattern of the rotor 101 at a timing determined on the basis of the above-stated distance measurement signal. The energizing or power supply timing for the rotor is as shown in FIG. 22. Referring to FIG. 22 which is a wave form chart, the timing for effecting power supply to the rotor 101 is determined on the basis of the measured far, medium or near distance. In cases where the object is located at a far distance, power supply is not immediately effected to the coil pattern 101b of the rotor 101 after the start signal, indicative of the start of the set plate 104 is produced. Therefore, in that event, the AF control lever 107 comes to a stop with its bent up part 107 coming to abut on the claw 101e of the rotor 101. Following that, the set plate 104 further travels. The arm part 104e comes to push the arm part 130b of the stop pawl 130. This causes the stop pawl 130 to turn clockwise. The claw part 130c of the stop pawl 130 disengages the claw part 105c of the distance ring 105. The spring 106 then causes the distance ring 105 to turn clockwise. The claw tooth 105d engages the pin 107d of the AF control lever 107. The AF control lever 107 turns counterclockwise to a very small extent and comes to a stop. In this instance, the photo-taking lens (not shown) is drawn out to a far distance position. Further, since the claw 101e of the rotor 101 is separated only to a short extent from the bent up part 107c of the AF control lever 107, the rotor 101 is able to promptly shift to a next step of operating the shutter.

In the event of a medium object distance, the rotor 101 is energized concurrently with the start of the set plate 104. The claws 101e and 101f of the rotor 101 come outside the locus of motion of the bent up part 107c of the AF control lever 107. This allows the AF control lever 107 to turn clockwise following the bent up part 104c of the set plate 104. At a point of time when the bent up part 107c of the AF control lever 107 passes through the claw 101e of the rotor 101, an intermediate signal is produced to the IC from an intermediate switch (not shown). Upon receipt of the intermediate signal, the IC cuts off power supply to the rotor 101. The rotor 101 comes back to the charged position of FIG. 18. The AF control lever 107 comes to a stop with its bent up part 107c engaging the claw 101f of the rotor 101 (see FIG. 19). After that, the operation is performed in the same manner as in the case of the far object distance described in the foregoing. The arm part 104e of the set plate 104 causes the stop pawl 130 to turn clockwise. This unlocks the distance ring 105 to allow the distance ring 105 to turn clockwise. The claw tooth 105e of the distance ring 105 comes to engage the pin 107d of the AF control lever 107 to cause thereby the AF control lever 107 to turn counterclockwise to a small extent. As a result, the photo-taking lens is set in a medium distance position. At that time, there is produced a small clearance between the claw 101f of the rotor 101 and the bent up part 107c of the AF control lever 107 to permit the rotor 101 to promptly shift to the next step of operating the shutter.

If the object is located at a near distance, the rotor 101 is energized concurrently with the start of the set plate 104 and remains energized until the shutter is operated. Therefore, the claws 101e and 101f of the rotor 101 do not abut on the bent up part 107c of the AF control lever 107. The bent up part 107c abuts on the arm part 111c of the restriction lever 111 to bring the turning motion of the AF control lever 107 to a stop. After that, the subsequent steps of the operation are similar to those of the operation for far and medium object distances. In other words, the distance ring 105 is released from the state of being locked by the stop pawl 130. The claw tooth 105f of the distance ring 105 abuts on the pin 107d of the AF control lever 107 to bring about the subsequent steps of operation in the manner as those mentioned in the foregoing. An exposure is performed by known means. Upon completion of the exposure, known winding and charging means performs a winding operation. Then, the embodiment resumes the charged state as shown in FIG. 18.

The operation in the flash photographing mode is as follows: In the case of FIG. 20, the flash device is drawn out for photographing and the embodiment is shown as in a charged state. When the photographer draws out the flash device frame body 125 from the condition of the normal photographing mode shown in FIG. 18 for the purpose of carrying out flash photography, the guide plate 127 which is in one unified body with the flash device frame body 125 slides to the right with its guide slots 127a guided by the shafts 122b of the flash device carrying plate 122. At a point where the shafts 122b abut on the left ends of the guide slots 127a, the flash device carrying plate 122 is turned counterclockwise as viewed on the drawing. The stopper brings the plate 122 to a stop at a point where the click spring 129 comes to engage the click groove 127d and keeps it in the position as shown in FIG. 20. At the end of the sliding motion, the bent down part 125a of the flash device frame body 125 engages the end face 121b of the close-up photographing knob 121 to cause the knob 121 to slide about 2mm to the right. Then, the mode switch-over lever 113 which is arranged in one unified body with the close-up photographing knob 121 also slides to the right against the force of the spring 115. Then, the contact piece 116 which is attached to the lever 113 causes power supply to be effected to the patterns 120a and 120b of the print-circuit board 120. This causes a known flashing capacitor to begin to be charged. Further, the rightward sliding movement of the mode switch-over lever 113 releases the FA operation lever 109 from its state of being urged by the bent up part 113d of the lever 113. The FA operation lever 109, therefore, somewhat turns counterclockwise as viewed on the drawing. The cam part 109b of the lever 109 abuts on the bent up part 107 of the AF control lever 107 and comes to a stop there. Then, following the clockwise turning movement of the AF control lever 107 resulting from a release operation, the FA operation lever 109 is caused to turn counterclockwise by the force of the spring 110. Meanwhile, the sliding movement of about 2 mm of the mode switch-over lever 113 mentioned above still keeps the pin 111d of the restriction lever 111 abutting on the bottom face part 113b of the lever 113. The lever 111 thus still remains in the same charged state as shown in FIG. 18.

Under this condition, when a shutter release operation is performed, distance measurement is carried out in the same manner as in the normal photographing mode. The set plate 104 then travels. Following the travel, the AF control lever 107 turns clockwise until it is stopped by the rotor 101 in a position corresponding to the distance measured. Then, up to that position, the FA operation lever 109 also turns following the AF control lever 107. Next, the distance ring 105 is disengaged from the stop pawl 130 and turns until it comes to a stop after causing the AF control lever 107 to somewhat turn counterclockwise. At that instant, the FA operation lever 1 to a small degree and is kept in that position. Following this, the rotor 101 turns clockwise following the travel of the bent up part 104b of the set plate 104 to open and close the shutter blades. In the case of the flash photographing graphing mode, however, the diameter of opening of the shutter blades, that is, an aperture diameter is limited with the cam part 101g of the rotor 101 coming to abut on the pin 109c of the FA operation lever 109. An exposure operation comes to an end in the same manner as in the normal photographing mode. Winding and charging means then brings the embodiment into the charged state as shown in FIG. 20.

Next, in the event of the close-up photographing mode, the embodiment operates as follows: FIG. 21 shows the embodiment as in a charged state under a close-up photographing condition obtained by sliding the close-up photographing knob 121 to the right as viewed on the drawing. In other words, to carry out close-up photography, the photographer slides the close-up photographing knob 121 to the right from its position of the normal photographing mode of FIG. 18. With the knob 121 thus slidden about 4 mm and kept there, there obtains the condition of FIG. 21. In this instance, the spring 115 exerts a force leftward on the mode switch-over lever 113 which is arranged in one unified body with the knob 121. However, the clicking protrudent part 113g of the lever 113 engages the rising part 117b of the clock lever 117 to bring it to a stop in a balanced state. However, when the photographer wishes to stop close-up-photography while the camera is in the close-up photographing mode, the close-up photographing knob 121 is strongly pushed to the left.

Then, the balance is lost and the clicking protrudent part 113g of the mode switch-over lever 113 overrides the rising part 117b to bring the lever 113 back to the position for the normal photographing mode as shown in FIG. 18

Under the condition as shown in FIG. 21, the mode switch-over lever 113 is slidden to the right while the flash device frame body 125 and the flash device carrying plate 122 are in the same positions as in the normal photographing mode of FIG. 18. With the mode switch-over lever thus slidden to the right, the contact piece 116 of the lever 113 makes the patterns 120a and 120b of the print-circuit board 120 conductive to close the flashing switch. In addition to that, the bent up part 113d of the mode switch-over lever 113 releases the FA operation lever 109 from an urged state in the same manner as in the case of the flash photographing mode shown in FIG. 19. The FA operation lever 109 is thus freed. The pin 111d of the restriction lever 111 shifts its abutting part from the bottom face part 113b of the lever 113 to the slanting face part 113c of the lever 113. Therefore, the restriction lever 111 is turned further counterclockwise by the spring 112 from the position thereof shown in FIG. 18. Therefore, the arm part 111c of the restriction lever 111 is deviating to the right as shown in FIG. 21. The bent up part 111b of the lever 111 pushes the upper edge 101h of the rotor 101 to cause thereby the rotor 101 to turn clockwise as viewed on FIG. 21. The claws 101e and 101f of the rotor 101 are therefore located outside the locus of motion of the bent up part 107c of the AF control lever 107.

Under the condition of FIG. 21, when the photographer direct the camera to an object to be photographed and pushes the shutter release button, the set plate 104 begins to travel. This causes power supply either effected or not effected to the rotor 101 according to the distance measurement signal obtained. However, since the rotor 101 is mechanically urged by the restriction lever 111 and is located outside the moving locus of the bent up part 107c of the AF control lever 107, the AF control lever 107 follows the set plate 104 and turns clockwise until it abuts on the arm part 111c of the restriction lever 111.

After this, the stop pawl 130 disengages the distance ring 105 to allow the latter to turn. However, since AF control lever 107 is located further to the right i.e. in the clockwise direction, from the near distance position thereof for the normal photographing mode, the pin 107 of the AF control does not engage any of the claw teeth of the distance ring 105. The distance ring 105 does not stop until the claw tooth 105d thereof comes to abut on the stopper 132. The photo-taking lens is thus set in a close-up photographing position which is obtained by further drawing out the lens than the near distance position thereof.

Meanwhile, the FA operation lever 109 also turns following the turning movement of the AF control lever 107. Therefore, the extent to which the shutter blades are opened by the rotor 101 after the above-stated process is limited by the abutting contact of the pin 109c of the FA operation lever 109 with the cam part 101g of the rotor 101. The xenon tube 126 is allowed to flash under this condition and the exposure comes to an end. Upon completion of the shutter operation, the film, the shutter and the automatic focusing mechanism are wound up and charged by known winding means. At the last stage of this winding operation, the bent up part 104d of the set plate 104 engages one end part 119c of the close-up photographing reset lever 119 to cause thereby the lever 119 to turn clockwise. The other end 119b of the lever 119 then turns the click lever 117 clockwise against the force of the spring 118. The rising part 117b of the click lever 117 disengages the protrudent part 113g of the mode switch-over lever 113. The mode switch-over lever 113 and the close-up photographing knob 121 are together caused by the force of the spring 115 to slide to the left as viewed on FIG. 21 and thus come back to the charged position of the normal photographing mode as shown in FIG. 18.

In the close-up photographing mode, the light distributing direction of the xenon tube 126 disposed in the flash device frame body 125 is closer to the phototaking optical axis than for the flash photographing mode shown in FIG. 20 by the degree to which the flash device carrying plate 122 is turned. In other words, in the case of close-up photography, the light distributing direction is shifted toward a nearer distance to have the object uniformly illuminated.

Further, for the close-up photographing mode, the flash device frame body 125 is left in a stowed state. However, since the close-up photographing knob 121 comes to protrude about 4 mm from the side face of the flash device, this arrangement effectively prevents the flash device from having its front inadvertently covered by the hand of the photographer.

In the embodiment described above, a rotor having a printed coil pattern is used for the automatic focusing device of the camera. However, this rotor of course may be replaced with the ordinary type using a magnet.

The various problems hitherto presented by the prior art cameras of the type permitting close-up photography can be solved in accordance with this invention as has been described in the foregoing. The invention is therefore highly advantageous. Particularly, the invented arrangement to correct the parallax of the view finder; to correct the distance measurable range of the distance measuring device; to shift the focus adjusting manner; to shift the automatic flashing mechanism; to change the photo-taking lens drawing-out or -in extent and so on permits an apposite photography without fail even for an object located at a very near distance. Besides, the invention permits simplification of construction and reduction in cost. Application of the invention to a camera of the type permitting close-up photography, therefore, gives an extremely advantageous effect.

Further, the invented arrangement to automatically bring the camera back to the normal photographing mode after completion of photographing in the close-up mode not only effectively prevents the electric energy from being wasted by an erroneous operation and unnecessary power supply to the flash device, etc. but also is extremely advantageous in terms of operation.

What I claim:

1. A camera able to perform close-up photography, comprising:
    (a) change-over means for changing the camera from an ordinary photographic mode to a close-up photographic mode; and
    (b) return means for causing the camera to automatically return to the ordinary photographic mode from the close-up photographic mode with completion of one photograph.

2. A camera according to claim 1, further comprising a finder which changes over to be usable for close-up photography in response to the change-over from the ordinary photographic mode to the close-up photographic mode by the change-over means.

3. A camera according to claim 2, further comprising flash emitting means which gets into a state ready for flash emission in response to the change-over by the change-over means from the ordinary photographic mode to the close-up photographic mode.

4. A camera according to claim 1, further comprising flash emitting means which gets into a state ready for flash emission in response to the change-over by the change-over means from the ordinary photographic mode to the close-up photographic mode.

5. A camera able to perform close-up photography, comprising:
    (a) control means for changing the camera from an ordinary state to a state enabling close-up photography; and
    (b) return means for causing the camera to automatically return to the ordinary state from the state enabling the close-up photography mode with completion of one photograph.

6. A camera according to claim 5, further comprising a finder which changes over to be usable for close-up photography in response to the changing of the camera by the control means from the ordinary state to the state enabling close-up photography.

7. A camera according to claim 6, further comprising a flash emitting device which gets into a state ready for flash emission in response to the changing of the camera by the control means from the ordinary state to the state enabling the close-up photography.

8. A camera according to claim 5, further comprising a flash emitting device which gets into a state ready for flash emission in response to the changing of the camera by the control means from the ordinary state to the state enabling the close-up photography.

9. A device for changing over photographic modes of a camera comprising:
    (a) photographic mode change-over means for changing over the camera from a first photographic mode to a second photographic mode;
    (b) a finder which changes the direction of a visual field in response to a change-over by the change-over means from the first photographic mode to the second photographic made; and
    (c) return means for returning the camera from the second photographic mode to the first photographic mode upon completion of one photograph.

10. A device according to claim 9, and further comprising operation means for enabling by manual operation a return of the camera from the second photographic mode to the first photographic mode at a time other than at the time of completion of one photograph.

11. A device for changing over photographic modes of a camera comprising:
    (a) photographic mode change-over means for changing over the camera from a first photographic mode to a second photographic mode;
    (b) flash emitting means which gets into a state ready for the flash emission in response to the change-over by the photographic mode change-over means from the first photographic mode to the second photographic mode; and
    (c) return means for returning the camera from the second photographic mode to the first photographic mode upon completion of one photograph.

12. A device according to claim 11, and further comprising operation means for enabling by manual operation a return of the camera from the second photographic mode to the first photographic mode at a time other than at the time of completion of one photograph.

13. A camera able to perform close-up photography, comprising:
    (a) change-over means for changing the camera from an ordinary photographic mode to a close-up photographic mode; and
    (b) return means for causing the camera to automatically return to the ordinary photographic mode from the close-up photographic mode in response to a preparatory operation for a subsequent photograph.

14. A camera according to claim 13, further comprising finder means which changes over to be usable for close-up photography in response to the change-over from the ordinary photographic mode to the close-up photographic mode by the change-over means.

15. A camera according to claim 14, further comprising flash emitting means which gets into a state ready for flash emission in response to the change-over by the change-over means from the ordinary photographic mode to the close-up photographic mode.

16. A camera according to claim 13, further comprising flash emitting means which gets into a state ready for flash emission in response to the change-over by the change-over means from the ordinary photographic mode to the close-up photographic mode.

17. A camera able to perform close-up photography comprising:
    (a) control means for changing the camera from an ordinary state to a state enabling close-up photography; and
    (b) return means for causing the camera to automatically return to the ordinary state from the state enabling the close-up photography in response to a preparatory operation for a subsequent photograph.

18. A camera according to claim 17, further comprising finder means which changes over to be usable for close-up photography in response to the changing of the camera by the control means from the ordinary state to the state enabling close-up photography.

19. A camera according to claim 18, further comprising flash emitting means which gets into a state ready for flash emission in response to the changing of the camera by the control means from the ordinary state to the state enabling the close-up photography.

20. A camera according to claim 17, further comprising flashing emitting means which gets into a state ready for flash emission in response to the changing of the camera by the control means from the ordinary state to the state enabling the close-up photography.

21. A device for changing over photographic modes of a camera comprising:
    (a) photographic mode change-over means for changing over the camera from a first photographic mode to a second photographic mode;
    (b) finder means which corrects a parallax in response to a change-over by the change-over means from the first photographic mode to the second photograph mode; and
    (c) return means for returning the camera from the second photographic mode to the first photographic mode upon completion of one photograph.

22. A device according to claim 21, and further comprising operation means for enabling by manual operation a return of the camera from the second photographic mode to the first photographic mode at a time other than at the time of completion of one photograph.

23. A camera able to perform close-up photography, comprising:
  (a) change-over means for changing the camera from a predetermined photographic mode to a close-up photographic mode; and
  (b) return means for causing the camera to automatically return to the predetermined photographic mode from the close-up photographic mode with completion of one photograph.

24. A device according to claim 23, and further comprising operation means for enabling by manual operation a return of the camera from the close-up photographic mode to the predetermined photographic mode at a time other than at the time of completion of one photograph.

25. A camera according to claim 23, further comprising finder means which changes to be usable for close-up photography in response to the change-over from the predetermined photographic mode to the close-up photographic mode by the change-over means.

26. A camera according to claim 25, further comprising flash emitting means which gets into a state ready for flash emission in response to the change-over by the change-over means from the predetermined photographic mode to the close-up photographic mode.

27. A camera according to claim 23, further comprising flash emitting means which gets into a state ready for flash emission in response to the change-over by the change-over means from the predetermined photographic mode to the close-up photographic mode.

28. A camera able to perform close-up photography, comprising:
  (a) control means for changing the camera from a predetermined state to a state enabling close-up photography; and
  (b) return means for causing the camera to automatically return to the predetermined state from the state enabling the close-up photography mode with completion of one photograph.

29. A camera according to claim 28, and further comprising operation means for enabling by manual operation a return of the camera from the state enabling the close-up photographic mode to the predetermined state at a time other than at the time of completion of one photograph.

30. A camera according to claim 28, further comprising finder means which changes to be usable for close-up photography in response to the changing of the camera by the control means from the predetermined state to the state enabling close-up photography.

31. A camera means according to claim 30, further comprising flash emitting means which gets into a state ready for flash emission in response to the changing of the camera by the control means from the predetermined state to the state enabling the close-up photography.

32. A camera according to claim 28, further comprising flash emitting means which gets into a state ready for flash emission in response to the changing of the camera by the control means from the predetermined state to the state enabling the close-up photography.

33. A device for changing over photographic modes of a camera comprising:
  (a) photographic mode change-over means for changing over the camera from a first photographic mode to a second photographic mode;
  (b) return means for returning the camera from the second photographic mode to the first photographic mode upon completion of one photograph; and
  (c) flash emitting means which gets into a operable state able to flash in response to a change-over to the second photographic mode and is released out of the operable state in response to return from the second photographic mode to the first photographic mode.

34. A device according to claim 33, and further comprising operation means for enabling by manual operation a return of the camera from tho second photographic mode to the first photographic mode at a time other than at the time of completion of one photograph.

35. A camera abe to perform close-up photography, comprising:
  (a) change-over means for changing the camera from a predetermined photographic mode to a close-up photographic mode; and
  (b) return means for causing the camera to automatically return to the predetermined photographic mode from the close-up photographic mode in response to a preparatory operation for a subsequent photograph.

36. A camera according to claim 35, and further comprising operation means for enabling by manual operation a return of the camera from the close-up photographic mode to the predetermined photographic mode at a time other than at the time of the preparatory operation for a subsequent photograph.

37. A camera according to claim 35, further comprising finder means which changes to be usable for close-up photography in response to a change-over from the predetermined photographic mode to the close-up photographic mode by the change-over means.

38. A camera according to claim 37, further comprising flash emitting means which gets into a state ready for flash emission in response to the change-over by the change-over means from the predetermined photographic mode to the close-up photographic mode.

39. A camera according to claim 35, further comprising flash emitting means which gets into a state ready for flash emission in response to a change-over by the change-over means from the predetermined photographic mode to the close-up photographic mode.

40. A camera able to perform close-up photography comprising:
  (a) control means for changing the camera from a predetermined state to a state enabling close-up photography; and
  (b) return means for causing the camera to automatically return to the predetermined state from the state enabling the close-up photography in response to a preparatory operation for a subsequent photograph.

41. A camera according to claim 40, and further comprising operation means for enabling by manual operation a return of the camera from the state enabling the close-up photography mode to the predetermined state at a time other than at the time of the preparatory operation for a subsequent photograph.

42. A camera according to claim 40, further comprising finder means which changes to be usable for close-up photography in response to the changing of the camera by the control means from the predetermined state to the state enabling close-up photography.

43. A camera according to claim 42, further comprising flash emitting means which gets into a state ready for flash emission in response to the changing of the camera by the control means from the predetermined state to the state enabling the close-up photography.

44. A camera according to claim 40, further comprising flashing emitting means which gets into a state ready for flash emission in response to the changing of the camera by the control means from the predetermined state to the state enabling the close-up photography.

45. A device for changing over photographic modes of a camera comprising:
  (a) photographic mode change-over means for changing over the camera from a first photographic mode to a second photographic mode;
  (b) return means for returning the camera from the second photographic mode to the first photographic mode in response to a preparatory operation for a subsequent photograph; and
  (c) flash emitting means which gets into a operable state able to flash response to a change-over to the second photographic mode and is released out of the operable state in response to return from the second photographic mode to the first photographic mode.

46. A device according to claim 45, and further comprising operation means for enabling by manual operation a return of the camera from the second photographic mode to the first photographic mode at a time other than at the time of the preparatory operation for a subsequent photograph.

47. A camera comprising:
  (a) photographic mode change-over means for changing over the camera from a first photographic mode to a second photographic mode;
  (b) return means for returning the camera from the second photographic mode to the first photographic mode upon completion of one photograph; and
  (c) flash emitting means which gets into a operable state able to flash in response to a change-over to the second photographic mode and is released out of the operable state in response to return from the second photographic mode to the first photographic mode.

48. A camera according to claim 47, and further comprising operation means for enabling by manual operation a return of the camera from the second photographic mode to the first photographic mode at a time other than at the time of completion of one photograph.

49. A camera comprising:
  (a) photographic mode change-over means for changing over the camera from a first photographic mode to a second photographic mode;
  (b) return means for returning the camera from the second photographic mode to the first photographic mode in response to a preparatory operation for a subsequent photograph; and
  (c) flash emitting means which gets into a operable state able to flash in response to a change-over to the second photographic mode and is released out of the operable state in response to return from the second photographic mode to the first photographic mode.

50. A camera according to claim 49, and further comprising operation means for enabling by manual operation a return of the camera from the second photographic mode to the first photographic mode at a time other than at the time of the preparatory operation for a subsequent photograph.

51. An apparatus for performing close-up photography, comprising:
  (a) change-over means for changing the apparatus from an ordinary photographic mode to a close-up photographic mode; and
  (b) return means for causing the apparatus to automatically return to the ordinary photographic mode from the close-up photographic mode with completion of one photograph.

52. An apparatus according to claim 51, and further comprising operation means for enabling by manual operation a return of the camera from the close-up photographic mode to the predetermined photographic mode at a time other than at the time of completion of one photograph.

53. An apparatus according to claim 25, further comprising a finder which changes over to be usable for close-up photography in response to the change-over from the ordinary photographic mode to the close-up photographic mode by the change-over means.

54. An Apparatus according to claim 53, further comprising flash emitting means which gets into a state ready for flash emission in response to the change-over by the change-over means from the ordinary photographic mode to the close-up photographic mode.

55. An apparatus according to claim 51, further comprising flash emitting means which gets into a state ready for flash emission in response to the change-over by the change-over means from the ordinary photographic mode to the close-up photographic mode.

56. An apparatus for performing close-up photography, comprising:
  (a) control means for changing the apparatus from an ordinary state to a state enabling close-up photography; and
  (b) return means for causing the apparatus to automatically return to the ordinary state from the state enabling the close-up photography mode with completion of one photograph.

57. An apparatus according to claim 56, and further comprising operation means for enabling by manual operation a return of the camera from the state enabling the close-up photography mode to the predetermined state at a time other than at the time of completion of one photograph.

58. An apparatus according to claim 56, further comprising a finder which changes over to be usable for close-up photography in response to the changing of the apparatus by the control means from the ordinary state to the state enabling close-up photography.

59. An apparatus according to claim 58, further comprising a flash emitting device which gets into a state ready for flash emission in response to the changing of the apparatus by the control means from the ordinary state to the state enabling the close-up photography.

60. An apparatus according to claim 56, further comprising a flash emitting device which gets into a state ready for flash emission in response to the changing of the apparatus by the control means from the ordinary state to the state enabling the close-up photography.

61. An apparatus for performing close-up photography, comprising:
  (a) change-over means for changing the apparatus from an ordinary photographic mode to a close-up photographic mode; and (b) return means for causing the apparatus to automatically return to the ordinary photographic mode from the close-up photographic mode in response to a preparatory operation for a subsequent photograph.

62. An apparatus according to claim 61, and further comprising operation means for enabling by manual operation a return of the camera from the close-up photographic mode to the predetermined photographic mode at a time other than at the time of the preparatory operation for a subsequent photograph.

63. An apparatus according to claim 61, further comprising finder means which changes over to be usable for close-up photography in response to the change-over from the ordinary photographic mode to the close-up photographic mode by the change-over means.

64. An apparatus according to claim 63, further comprising flash emitting means which gets into a state ready for flash emission in response to the change-over by the change-over means from the ordinary photographic mode to the close-up photographic mode.

65. An apparatus according to claim 61, further comprising flash emitting means which gets into a state ready for flash emission in response to the change-over by the change-over means from the ordinary photographic mode to the close-up photographic mode.

66. An apparatus for performing close-up photography, comprising:
 (a) control means for changing the apparatus from an ordinary state to a state enabling close-up photography; and
 (b) return means for causing the apparatus to automatically return to the ordinary state from the state enabling the close-up photography in response to the preparatory operation for a subsequent photograph.

67. An apparatus according to claim 66, and further comprising operation means for enabling by manual operation a return of the camera from the state enabling the close-up photography to the ordinary state at a time other than at the time of the preparatory operation for a subsequent photograph.

68. An apparatus according to claim 66, further comprising finder means which changes over to be usable for close-up photography in response to the changing of the apparatus by the control means from the ordinary state to the state enabling close-up photography.

69. An apparatus according to claim 68, further comprising flash emitting means which gets into a state ready for flash emission in response to the changing of the apparatus by the control means from the ordinary state to the state enabling the close-up photography.

70. An apparatus according to claim 66, further comprising flash emitting means which gets into a state ready for flash emission in response to the changing of the apparatus by the control means from the ordinary state to the state enabling the close-up photography.

71. An apparatus for performing close-up photography, comprising:
 (a) change-over means for changing the apparatus from a predetermined photographic mode to a close-up photographic mode; and
 (b) return means for causing the apparatus to automatically return to the predetermined photographic mode from the close-up photographic mode with completion of one photograph; and 72. An apparatus according to claim 71, and further comprising operation means for enabling by manual operation a return of the camera from the close-up photographic mode to the predetermined photographic mode at a time other than at the time of completion of one photograph.

73. An apparatus according to claim 71, further comprising finder means which changes to be usable for close-up photography in response to the change-over from the predetermined photographic mode to the close-up photographic mode by the change-over means.

74. An apparatus according to claim 71, further comprising flash emitting means which gets into a state ready for flash emission in response to the change-over by the change-over means from the predetermined photographic mode to the close-up photographic mode.

75. An apparatus according to claim 71, further comprising flash emitting means which gets into a state ready for flash emission in response to the change-over by the change-over means from the predetermined photographic mode to the close-up photographic mode.

76. An apparatus for performing close-up photography, comprising:
 (a) control means for changing the apparatus from a predetermined state to a state enabling close-up photography; and
 (b) return means for causing the apparatus to automatically return to the predetermined state from the state enabling the close-up photography mode with completion of one photograph.

77. An apparatus according to claim 76, further comprising finder means which changes to be usable for close-up photography in response to the changing of the apparatus by the control means from the predetermined state to the state enabling close-up photography.

78. An apparatus according to claim 77, further comprising flash emitting means which gets into a state ready for flash emission in response to the changing of the apparatus by the control means from the predetermined state to the state enabling the close-up photography.

79. An apparatus according to claim 76, further comprising flash emitting means which gets into a state ready for flash emission in response to the changing of the apparatus by the control means from the predetermined state to the state enabling the close-up photography.

80. An apparatus according to claim 76, and further comprising operation means for enabling by manual operation a return of the camera from the state enabling the close-up photography mode to the predetermined state at a time other than at the time of completion of one photograph.

81. An apparatus for performing close-up photography, comprising:
 (a) change-over means for changing the apparatus from a predetermined photographic mode to a close-up photographic mode; and
 (b) return means for causing the apparatus to automatically return to the predetermined photographic mode from the close-up photographic mode in response to a preparatory operation for a subsequent photograph.

82. An apparatus according to claim 81, further comprising finder means which changes to be usable for close-up photography in response to a change-over from the predetermined photographic mode to the close-up photographic mode by the change-over means.

83. An apparatus according to claim 81, further comprising flash emitting means which gets into a state ready for flash emission in response to the change-over by the change-over means from the predetermined photographic mode to the close-up photographic mode.

84. An apparatus according to claim 81, further comprising flash emitting means which gets into a state ready for flash emission in response to a change-over by the change-over means from the predetermined photographic mode to the close-up photographic mode.

85. An apparatus according to claim 81, and further comprising operation means for enabling by manual operation a return of the camera from the close-up photographic mode to the predetermined photographic mode at a time other than at the time of the preparatory operation for a subsequent photograph.

86. An apparatus for performing close-up photography, comprising:
   (a) control means for changing the apparatus from a predetermined state to a state enabling close-up photography; and
   (b) return means for causing the apparatus to automatically return to the predetermined state from the state enabling the close-up photography in response to a preparatory operation for a subsequent photograph.

87. An apparatus according to claim 86, and further comprising operation means for enabling by manual operation a return of the camera from the state enabling the close-up photography mode to the predetermined state at a time other than at the time of the preparatory operation for a subsequent photograph.

88. An apparatus according to claim 86, further comprising finder means which changes to be usable for close-up photography in response to the changing of the apparatus by the control means from the predetermined state to the state enabling close-up photography.

89. An apparatus according to claim 88, further comprising flash emitting means which gets into a state ready for flash emission in response to the changing of the apparatus by the control means from the predetermined state to the state enabling the close-up photography.

90. An apparatus according to claim 86, further comprising flash emitting means which gets into a state ready for flash emission in response to the changing of the apparatus by the control means from the predetermined state to the state enabling the close-up photography.

91. A camera changeable in photographic mode, comprising:
   (a) photographic mode change-over means for changing over the camera from a first photographic mode to a second photographic mode;
   (b) a finder which changes the direction of a visual field in response to a change-over by the change-over means from the first photographic mode to the second photographic mode; and
   (c) return means for returning the camera from the second photographic mode to the first photographic mode upon completion of one photograph.

92. A camera according to claim 91, and further comprising operation means for enabling by manual operation a return of the camera from the second photographic mode to the first photographic mode at a time other than at the time of completion of one photograph.

93. A camera changeable in photographic mode, comprising:
   (a) photographic mode change-over means for changing over the camera from a first photograph mode to a second photographic mode;
   (b) flash emitting means which gets into a state ready for the flash emission in response to the change-over by the photographic mode change-over means from the first photographic mode to the second photographic mode; and
   (c) return means for returning the camera from the second photographic mode to the first photographic mode upon completion of one photograph.

94. A camera according to claim 93, and further comprising operation means for enabling by manual operation a return of the camera from the second photographic mode to the first photographic mode at a time other than at the time of completion of one photograph.

95. A camera changeable in photographic mode, comprising:
   (a) photographic mode change-over means for changing over the camera from a first photographic mode to a second photographic mode;
   (b) a finder which changes over the direction of a visual field in response to a change-over by the change-over means from the first photographic mode to the second photographic mode; and
   (c) return means for returning the camera from the second photographic mode to the first photographic mode in response to a preparatory operation for a subsequent photograph.

96. A camera according to claim 95, and further comprising operation means for enabling by manual operation a return of the camera from the second photographic mode to the first photographic mode at a time other than at the time of the preparatory operation for a subsequent photograph.

97. A camera changeable in photographic mode, comprising:
   (a) photographic mode change-over means for changing over the camera from a first photographic mode to a second photographic mode;
   (b) flash emitting means which gets into a state ready for flash emission in response to the change-over by the photographic mode change-over means from the first photographic mode to the second photographic mode; and
   (c) return means for returning the camera from the second photographic mode to the first photographic mode in response to a preparatory operation for a subsequent photograph.

98. A camera according to claim 97, and further comprising operation means for enabling by manual operation a return of the camera from the second photographic mode to the first photographic mode at a time other than at the time of the preparatory operation for a subsequent photograph.

99. A device for changing over photographic modes of a camera, comprising:
   (a) photographic mode change-over means for changing over the camera from a first photographic mode to a second photographic mode;
   (b) a finder which changes over the direction of a visual field in response to a change-over by the change-over means from the first photographic mode to the second photographic mode; and
   (c) return means for returning the camera from the second photographic mode to the first photographic mode in response to the preparatory operation for a subsequent photograph.

100. A device according to claim 99, and further comprising operation means for enabling by manual operation a return of the camera from the second photographic mode to the first photographic mode at a time other than at the time of the preparatory operation for a subsequent photograph.

101. A device for changing over photographic modes of a camera, comprising:
   (a) photographic mode change-over means for changing over the camera from a first photographic mode to a second photographic mode;
   (b) flash emitting means which gets into a state ready for a flash emission in response to the change-over by the photographic mode change-over means from the first photographic mode to the second photographic mode; and
   (c) return means for returning the camera from the second photographic mode to the first photographic mode in response to a preparatory operation for a subsequent photograph.

102. A device according to claim 101, and further comprising operation means for enabling by manual operation a return of the camera from the second photographic mode to the first photographic mode at a time other than at the time of the preparatory operation for a subsequent photograph.

103. An apparatus for changing over photographic modes of a camera, comprising:
   (a) photographic mode change-over means for changing over the camera from a first photographic mode to a second photographic mode;
   (b) finder change-over means for changing the direction of a visual field of a finder in response to the change-over by the photographic mode change-over means from the first photographic mode to the second photographic mode; and
   (c) return means for returning the camera from the second photographic mode to the first photographic mode upon completion of one photograph.

104. An apparatus according to claim 103, and further comprising operation means for enabling by manual operation a return of the camera from the second photographic mode to the first photographic mode at a time other than at the time of completion of one photograph.

105. An apparatus for changing over photographic modes of a camera, comprising:
   (a) photographic mode change-over means for changing over the camera from a first photographic mode to a second photographic mode;
   (b) flash change-over means for getting a flash device into a state ready for the flash emission in response to the change-over by the photographic mode change-over means from the first photographic mode to the second photographic mode; and
   (c) return means for returning the camera from the second photographic mode to the first photographic mode upon completion of one photograph.

106. An apparatus according to claim 105, and further comprising operation means for enabling by manual operation a return of the camera from the second photographic mode to the first photographic mode at a time other than at the time of completion of one photograph.

107. An apparatus for changing over photographic modes of a camera, comprising:
   (a) photographic mode change-over means for changing over the camera from a first photographic mode to a second photographic mode;
   (b) flash change-over means for getting a flash device into an operable state in response to the change-over by the photographic mode change-over means from the first photographic mode to the second photographic mode; and
   (c) return means for returning the camera from the second photographic mode to the first photographic mode upon completion of one photograph.

108. An apparatus according to claim 107, and further comprising operation means for enabling by manual operation a return of the camera from the second photographic mode to the first photographic mode at a time other than at the time of completion of one photograph.

109. An apparatus for changing over photographic modes of a camera, comprising:
   (a) photographic mode change-over means for changing over the camera from a first photographic mode to a second photographic mode;
   (b) return means for returning the camera from the second photographic mode to the first photographic mode upon completion of one photograph; and
   (c) flash change-over means for getting a flash device into an operable state able to flash in response to the change-over to the second photographic mode and for releasing the flash device out of the operable state in response to the return from the second photographic mode to the first photographic mode.

110. An apparatus according to claim 109, and further comprising operation means for enabling by manual operation a return of the camera from the second photographic mode to the first photographic mode at a time other than at the time of completion of one photograph.

111. An apparatus for changing over photographic modes of a camera, comprising:
   (a) photographic mode change-over means for changing over the camera from a first photographic mode to a second photographic mode;
   (b) return means for returning the camera from the second photographic mode to the first photographic mode upon completion of one photograph; and
   (c) flash change-over means for getting a flash device into an operable state in response to the change-over to the second photographic mode and for releasing the flash device out of the operable state in response to the return from the second photographic mode to the first photographic mode.

112. An apparatus according to claim 111, and further comprising operation means for enabling by manual operation a return of the camera from the second photographic mode to the first photographic mode at a time other than at the time of completion of one photograph.

113. An apparatus for changing over photographic modes of a camera, comprising:
   (a) photographic mode change-over means for changing over the camera from a first photographic mode to a second photographic mode;
   (b) return means for returning the camera from the second photographic mode to the first photographic mode upon completion of one photograph; and
   (c) flash change-over means for releasing a flash device out of an operable state in which it is able to flash in response to the return from the second photographic mode to the first photographic mode.

114. An apparatus according to claim 113, and further comprising operation means for enabling by manual operation a return of the camera from the second photographic mode to the first photographic mode at a time other than at the time of completion of one photograph.

115. An apparatus for changing over photographic modes of a camera, comprising:
(a) photographic mode change-over means for changing over the camera from a first photographic mode to a second photographic mode;
(b) return means for returning the camera from the second photographic mode to the first photographic mode upon completion of one photograph; and
(c) flash change-over means for releasing a flash device out of an operable state in response to the return from the second photographic mode to the first photographic mode.

116. An apparatus according to claim 115, and further comprising operation means for enabling by manual operation a return of the camera from the second photographic mode to the first photographic mode at a time other than at the time of completion of one photograph.

117. An apparatus for changing over photographic modes of a camera, comprising:
(a) photographic mode change-over means for changing over the camera from a first photographic mode to a second photographic mode;
(b) return means for returning the camera from the second photographic mode to the first photographic mode in response to a preparatory operation for a subsequent photograph; and
(c) flash change-over means for getting a flash device into an operable state able to flash in response to the change-over to the second photographic mode and for releasing the flash device out of the operable state in response to the return from the second photographic mode to the first photographic mode.

118. An apparatus according to claim 117, and further comprising operation means for enabling by manual operation a return of the camera from the second photographic mode to the first photographic mode at a time other than at the time of the preparatory operation for a subsequent photograph.

119. An apparatus for changing over photographic modes of a camera, comprising:
(a) photographic mode change-over means for changing over the camera from a first photographic mode to a second photographic mode;
(b) return means for returning the camera from the second photographic mode to the first photographic mode in response to a preparatory operation for a subsequent photograph; and
(c) flash change-over means for getting a flash device into an operable state in response to the change-over to the second photographic mode and for releasing the flash device out of the operable state in response to the return from the second photographic mode to the first photographic mode.

120. An apparatus according to claim 119, and further comprising operation means for enabling by manual operation a return of the camera from the second photographic mode to the first photographic mode at a time other than at the time of the preparatory operation for a subsequent photograph.

121. An apparatus for changing over photographic modes of a camera, comprising:
(a) photographic mode change-over means for changing over the camera from a first photographic mode to a second photographic mode;
(b) return means for returning the camera from the second photographic mode to the first photographic mode in response to a preparatory operation for a subsequent photograph; and
(c) flash change-over means for releasing a flash device out of an operable state in which it is able to flash in response to the return from the second photographic mode to the first photographic mode.

122. An apparatus according to claim 121, and further comprising operation means for enabling by manual operation a return of the camera from the second photographic mode to the first photographic mode at a time other than at the time of the preparatory operation for a subsequent photograph.

123. An apparatus for changing over photographic modes of a camera, comprising:
(a) photographic mode change-over means for changing over the camera from a first photographic mode to a second photographic mode;
(b) return means for returning the camera from the second photographic mode to the first photographic mode in response to a preparatory operation for a subsequent photograph; and
(c) flash change-over means for releasing a flash device out of an operable state in response to the return from the second photographic mode to the first photographic mode.

124. An apparatus according to claim 123, and further comprising operation means for enabling by manual operation a return of the camera from the second photographic mode to the first photographic mode at a time other than at the time of the preparatory operation for a subsequent photograph.

125. A camera, comprising:
(a) photographic mode change-over means for changing over the camera from a first photographic mode to a second photographic mode;
(b) return means for returning the camera from the second photographic mode to the first photographic mode upon completion of one photograph; and
(c) flash change-over means for getting a flash device into an operable state able to flash an response to the change-over to the second photographic mode and for releasing the flash device out of the operable state in response to the return from the second photographic mode to the first photographic mode.

126. A camera according to claim 125, and further comprising operation means for enabling by manual operation a return of the camera from the second photographic mode to the first photographic mode at a time other than at the time of completion of one photograph.

127. A camera, comprising:
(a) photographic mode change-over means for changing over the camera from a first photographic mode to a second photographic mode;
(b) return means for returning the camera from the second photographic mode to the first photographic mode upon completion of one photograph; and
(c) flash change-over means for getting a flash device into an operable state in response to the change-over to the second photographic mode and for releasing the flash device out of the operable state in response to the return from the second photographic mode to the first photographic mode.

128. A camera according to claim 127, and further comprising operation means for enabling by manual operation a return of the camera from the second photographic mode to the first photographic mode at a time other than at the time of completion of one photograph.

129. A camera, comprising:
 (a) photographic mode change-over means for changing over the camera from a first photographic mode to a second photographic mode;
 (b) return means for returning the camera from the second photographic mode to the first photographic mode upon completion of one photograph; and
 (c) flash change-over means for releasing a flash device out of an operable state in which it is able to flash in response to the return from the second photographic mode to the first photographic mode.

130. A camera according to claim 129, and further comprising operation means for enabling by manual operation a return of the camera from the second photographic mode to the first photographic mode at a time other than at the time of completion of one photograph.

131. A camera, comprising:
 (a) photographic mode change-over means for changing over the camera from a first photographic mode to a second photographic mode;
 (b) return means for returning the camera from the second photographic mode to the first photographic mode upon completion of one photograph; and
 (c) flash change-over means for releasing a flash device out of an operable state in response to the return from the second photographic mode to the first photographic mode.

132. A camera according to claim 131, and further comprising operation means for enabling by manual operation a return of the camera from the second photographic mode to the first photographic mode at a time other than at the time of completion of one photograph.

133. A camera, comprising:
 (a) photographic mode change-over means for changing over the camera from a first photographic mode to a second photographic mode;
 (b) return means for returning the camera from the second photographic mode to the first photographic mode in response to a preparatory operation for a subsequent photograph; and
 (c) flash change-over means for getting a flash device into an operable state able to flash in response to the change-over to the second photographic mode and for releasing the flash device out of the operable state in response to the return from the second photographic mode to the first photographic mode.

134. A camera according to claim 133, and further comprising operation means for enabling by manual operation a return of the camera from the second photographic mode to the first photographic mode at a time other than at the time of the preparatory operation for a subsequent photograph.

135. A camera, comprising:
 (a) photographic mode change-over means for changing over the camera from a first photographic mode to a second photographic mode;
 (b) return means for returning the camera from the second photographic mode to the first photographic mode in response to a preparatory operation for a subsequent photograph; and
 (c) flash change-over means for getting a flash device into an operable state in response to the change-over to the second photographic mode and for releasing the flash device out of the operable state in response to the return from the second photographic mode to the first photographic mode.

136. A camera according to claim 135, and further comprising operation means for enabling by manual operation a return of the camera from the second photographic mode to the first photographic mode at a time other than at the time of the preparatory operation for a subsequent photograph.

137. A camera, comprising:
 (a) photographic mode change-over means for changing over the camera from a first photographic mode to a second photographic mode;
 (b) return means for returning the camera from the second photographic mode to the first photographic mode in response to a preparatory operation for a subsequent photograph; and
 (c) flash change-over means for releasing a flash device out of an operable state in which it is able to flash in response to the return from the second photographic mode to the first photographic mode.

138. A camera according to claim 137, and further comprising operation means for enabling by manual operation a return of the camera from the second photographic mode to the first photographic mode at a time other than at the time of the preparatory operation for a subsequent photograph.

139. A camera, comprising:
 (a) photographic mode change-over means for changing over the camera from a first photographic mode to a second photographic mode;
 (b) return means for returning the camera from the second photographic mode to the first photographic mode in response to a preparatory operation for a subsequent photograph; and
 (c) flash change-over means for releasing a flash device out of an operable state in response to the return from the second photographic mode to the first photographic mode.

140. A camera according to claim 139, and further comprising operation means for enabling by manual operation a return of the camera from the second photographic mode to the first photographic mode at a time other than at the time of the preparatory operation for a subsequent photograph.

141. A camera, comprising:
 (a) photographic mode change-over means for changing over the camera from a first photographic mode to a second photographic mode;
 (b) finder change-over means for changing the direction of a visual field of a finder in response to the change-over by the photographic mode change-over means from the first photographic mode to the second photographic mode; and
 (c) return means for returning the camera from the second photographic mode to the first photographic mode upon completion of one photograph.

142. A camera according to claim 141, and further comprising operation means for enabling by manual operation a return of the camera from the second photographic mode to the first photographic mode at a time other than at the time of completion of one photograph.

143. A camera, comprising:
(a) photographic mode change-over means for changing over the camera from a first photographic mode to a second photographic mode;
(b) flash change-over means for getting a flash device into a state ready for the flash emission in response to the change-over by the photographic mode change-over means from the first photographic mode to the second photographic mode; and
(c) return means for returning the camera from the second photographic mode to the first photographic mode upon completion of one photograph.

144. A camera according to claim 143, and further comprising operation means for enabling by manual operation a return of the camera from the second photographic mode to the first photographic mode at a time other than at the time of completion of one photograph.

145. A camera, comprising:
(a) photographic mode change-over means for changing over the camera from a first photographic mode to a second photographic mode;
(b) flash change-over means for getting a flash device into an operable state in response to the change-over by the photographic mode change-over means from the first photographic mode to the second photographic mode; and
(c) return for returning the camera from the second photographic mode to the first photographic mode upon completion of one photograph.

146. A camera according to claim 145, and further comprising operation means for enabling by manual operation a return of the camera from the second photographic mode to the first photographic mode at a time other than at the time of completion of one photograph.

147. A camera, comprising:
(a) photographic mode change-over means for changing over the camera from a first photographic mode to a second photographic mode;
(b) finder change-over means for changing over the direction of a visual field of a finder in response to the change-over by the photographic mode change-over means from the first photographic mode to the second photographic mode; and
(c) return mans for returning the camera from the second photographic mode to the first photographic mode in response to a preparatory operation for a subsequent photograph.

148. A camera according to claim 147, and further comprising operation means for enabling by manual operation a return of the camera from the second photographic mode to the first photographic mode at a time other than at the time of the preparatory operation for a subsequent photograph.

149. A camera, comprising:
(a) photographic mode change-over means for changing over the camera from a first photographic mode to a second photographic mode;
(b) flash change-over means for getting a flash device into a state ready for the flash emission in response to the change-over by the photographic mode change-over means from the first photographic mode to the second photographic mode; and
(c) return means for returning the camera from the second photographic mode to the first photographic mode in response to a preparatory operation for a subsequent photograph.

150. A camera according to claim 149, and further comprising operation means for enabling by manual operation a return of the camera from the second photographic mode to the first photographic mode at a time other than at the time of the preparatory operation for a subsequent photograph.

151. A camera, comprising:
(a) photographic mode change-over means for changing over the camera from a first photographic mode to a second photographic mode;
(b) flash change-over means for getting a flash device into an operable state in response to the change-over by the photographic mode change-over means from the first photographic mode to the second photographic mode; and
(c) return means for returning the camera from the second photographic mode to the first photographic mode in response to a preparatory operation for a subsequent photograph.

152. A camera according to claim 151, and further comprising operation means for enabling by manual operation a return of the camera from the second photographic mode to the first photographic mode at a time other than at the time of the preparatory operation for a subsequent photograph.

153. An apparatus for changing over photographic modes of a camera, comprising:
(a) photographic mode change-over means for changing over the camera from a first photographic mode to a second photographic mode;
(b) finder change-over means for changing the direction of a visual field of a finder in response to the change-over by the photographic mode change-over means from the first photographic mode to the second photographic mode; and
(c) return means for returning the camera from the second photographic mode to the first photographic mode in response to a preparatory operation for a subsequent photograph.

154. A camera according to claim 153, and further comprising operation means for enabling by manual operation a return of the camera from the second photographic mode to the first photographic mode at a time other than at the tine of the preparatory operation for a subsequent photograph.

155. An apparatus for changing over the photographic modes of a camera, comprising:
(a) photographic mode change-over means for changing over the camera from a first photographic mode to a second photographic mode;
(b) flash change-over means for getting a flash device into a state ready for the flash emission in response to the change-over by the photographic mode change-over means from the first photographic mode to the second photographic mode; and
(c) return means for returning the camera from the second photographic mode to the first photographic mode in response to a preparatory operation for a subsequent photograph.

156. A camera according to claim 155, and further comprising operation means for enabling by manual operation a return of the camera from the second photographic mode to the first photographic mode at a time other than at the time of the preparatory operation for a subsequent photograph.

157. An apparatus for changing over the photographic modes of a camera, comprising:

(a) photographic mode change-over means for changing over the camera from a first photographic mode to a second photographic mode;
(b) flash change-over means for getting a flash device into an operable state in response to the change-over by the photographic mode change-over means from the first photographic mode to the second photographic mode; and
(c) return means for returning the camera from the second photographic mode to the first photographic mode in response to a preparatory operation for a subsequent photograph.

158. A camera according to claim 157, and further comprising operation means for enabling by manual operation a return of the camera from the second photographic mode to the first photographic mode at a time other than at the time of the preparatory operation for a subsequent photograph.

159. A device for changing over photographic modes of a camera, comprising:
(a) photographic mode change-over means for changing over the camera from a first photographic mode to a second photographic mode;
(b) a finder which changes the direction of a visual field in response to a change-over by the change-over means from the first photographic mode to the second photographic mode; and
(c) return means for automatically returning the camera from the second photographic mode to the first photographic mode upon completion of one photograph.

160. A device according to claim 159, and further comprising operation means for enabling by manual operation a return of the camera from the second photographic mode to the first photographic mode at a time other than at the time of completion of one photograph.

161. A device for changing over photographic modes of a camera, comprising:
(a) photographic mode change-over means for changing over the camera from a first photographic mode to a second photographic mode;
(b) a flash emitting device which gets into a state ready for the flash emission in response to the change-over by the photographic mode change-over means from the first photographic mode to the second photographic mode; and
(c) return means for automatically returning the camera from the second photographic mode to the first photographic mode upon completion of one photograph.

162. A device according to claim 161, and further comprising operation means for enabling by manual operation a return of the camera from the second photographic mode to the first photographic made at a time other than at the time of completion of one photograph.

163. A device for changing over photographic modes of a camera, comprising:
(a) photographic mode change-over means for changing over the camera from a first photographic mode to a second photographic mode;
(b) return means for automatically returning the camera from the second photographic mode to the first photographic mode upon completion of one photograph; and
(c) flash emitting means which gets into an operable state able to flash in response to a change-over to the second photographic mode and is released out of the operable state in response to return from the second photographic mode to the first photographic mode.

164. A device according to claim 163, and further comprising operation means for enabling by manual operation a return of the camera from the second photographic mode to the first photographic mode at a time other than at the time of completion of one photograph.

165. A device for changing over photographic modes of a camera, comprising:
(a) photographic mode change-over means for changing over the camera from a first photographic mode to a second photographic mode;
(b) return means for automatically returning the camera from the second photographic mode to the first photographic mode in response to a preparatory operation for a subsequent photograph; and
(c) flash emitting means which gets into an operable state able to flash in response to a change-over to the second photographic mode and is released out of the operable state in response to return from the second photographic mode to the first photographic mode.

166. A device according to claim 165, and further comprising operation means for enabling by manual operation a return of the camera from the second photographic mode to the first photographic mode at a time other than at the time of the preparatory operation for a subsequent photograph.

167. A camera, comprising:
(a) photographic mode change-over means for changing over the camera from a first photographic mode to a second photographic mode;
(b) return means for automatically returning the camera from the second photographic mode to the first photographic mode upon completion of one photograph; and
(c) flash emitting means which gets into an operable state able to flash in response to a change-over to the second photographic mode and is released out of the operable state in response to return from the second photographic mode to the first photographic mode.

168. A camera according to claim 167, and further comprising operation means for enabling by manual operation a return of the camera from the second photographic mode to the first photographic mode at a time other than at the time of completion of one photograph.

169. A camera, comprising:
(a) photographic mode change-over means for changing over the camera from a first photographic mode to a second photographic mode;
(b) return means for automatically returning the camera from the second photographic mode to the first photographic mode in response to a preparatory operation for a subsequent photograph; and
(c) flash emitting means which gets into an operable state able to flash in response to a change-over to the second photographic mode and is released out of the operable state in response to return from the second photographic mode to the first photographic mode.

170. A camera according to claim 169, and further comprising operation means for enabling by manual operation a return of the camera from the second photographic mode to the first photographic mode at a time other than at the time of the preparatory operation for a subsequent photograph.

171. A camera changeable in photographic mode, comprising:
(a) photographic mode change-over means for changing over the camera from a first photographic mode to a second photographic mode;
(b) a finder which changes over the direction of a visual field in response to a change-over by the change-over means from the first photographic mode to the second photographic mode; and
(c) return means for automatically returning the camera from the second photographic mode to the first photographic mode in response to a preparatory operation for a subsequent photograph.

172. A camera according to claim 171, and further comprising operation means for enabling by manual operation a return of the camera from the second photographic mode to the first photographic mode at the time other than at the time of the preparatory operation for a subsequent photograph.

173. A camera changeable in photographic mode, comprising:
(a) photographic mode change-over means for changing over the camera from a first photographic mode to a second photographic mode;
(b) flash emitting means which gets into a state ready for flash emission in response to the change-over by the photographic mode change-over means from the first photographic mode to the second photographic mode; and
(c) return means for automatically returning the camera from the second photographic mode to the first photographic mode in response to a preparatory operation for a subsequent photograph.

174. A camera according to claim 173, and further comprising operation means for enabling by manual operation a return of the camera from the second photographic mode to the first photographic mode at a time other than at the time of the preparatory operation for a subsequent photograph.

175. A device changing over photographic modes of a camera, comprising:
(a) photographic mode change-over means for changing over the camera from a first photographic mode to a second photographic mode;
(b) a finder which changes the direction of a visual field in response to a change-over by the change-over means from the first photographic mode to the second photographic mode; and
(c) return means for automatically returning the camera from the second photographic mode to the first photographic mode in response to the preparatory operation for a subsequent photograph.

176. A device according to claim 175, and further comprising operation means for enabling by manual operation a return of the camera from the second photographic mode in the first photographic mode at a time other than at the time of the preparatory operation for a subsequent photograph.

177. A device for changing over photographic modes of a camera, comprising:
(a) a photographic mode change-over means for changing over the camera from a first photographic mode to a second photographic mode;
(b) flash emitting means which gets into a state ready for flash emission in response to the change-over by the photographic mode change-over means from the first photographic mode to the second photographic mode; and
(c) return means for automatically returning the camera from the second photographic mode to the first photographic mode in response to a preparatory operation for a subsequent photograph.

178. A device according to claim 177, and further comprising operation means for enabling by manual operation a return of the camera from the second photographic mode to the first photographic mode at a time other than at the time of the preparatory operation for a subsequent photograph.

179. An apparatus for changing over photographic modes of a camera, comprising:
(a) photographic mode change-over means for changing over the camera from a first photographic mode to a second photographic mode;
(b) finder change-over means for changing the direction of a visual field of a finder in response to the change-over by the photographic mode change-over means from the first photographic mode to the second photographic mode; and
(c) return means for automatically returning the camera from the second photographic mode to the first photographic mode upon completion of one photograph.

180. An apparatus according to claim 179, and further comprising operation means for enabling by manual operation a return of the camera from the second photographic mode to the first photographic mode at a time other than at the time of completion of one photograph.

181. An apparatus for changing over photographic modes of a camera, comprising:
(a) photographic mode change-over means for changing over the camera from a first photographic mode to a second photographic mode;
(b) flash change-over means for getting a flash device into a state ready for the flash emission in response to the change-over by the photographic mode change-over means from the first photographic mode to the second photographic mode; and
(c) return means for automatically returning the camera from the second photographic mode to the first photographic mode upon completion of one photograph.

182. An apparatus according to claim 181, and further comprising operation means for enabling by manual operation a return of the camera from the second photographic mode to the first photographic mode at a time other than at the time of completion of one photograph.

183. An apparatus for changing over photographic modes of a camera, comprising:
(a) photographic mode change-over means for changing over the camera from a first photographic mode to a second photographic mode;
(b) flash change-over means for getting a flash device into an operable state in response to the change-over by the photographic mode change-over means from the first photographic mode to the second photographic mode; and
(c) return means for automatically returning the camera from the second photographic mode to the first photographic mode upon completion of one photograph.

184. An apparatus according to claim 183, and further comprising operation means for enabling by manual operation a return of the camera from the second photographic mode to the first photographic mode at a time other than at the time of completion of one photograph.

185. An apparatus for changing over photographic modes of a camera, comprising:
(a) photographic mode change-over means for changing over the camera from a first photographic mode to a second photographic mode;
(b) return means for automatically returning the camera from the second photographic mode to the first photographic mode upon completion of one photograph; and
(c) flash change-over means for getting a flash device into an operable state able to flash in response to the change-over to the second photographic mode and for releasing the flash device out of the operable state in response to the return from the second photographic mode to the first photographic mode.

186. An apparatus according to claim 185, and further comprising operation means for enabling by manual operation a return of the camera from the second photographic mode to the first photographic mode at a time other than at the time of completion of one photograph.

187. An apparatus for changing over photographic modes of a camera, comprising:
(a) photographic mode change-over means for changing over the camera from a first photographic mode to a second photographic mode;
(b) return means for automatically returning the camera from the second photographic mode to the first photographic mode upon completion of one photograph; and
(c) flash change-over means for getting a flash device into an operable state in response to the change-over to the second photographic mode and for releasing the flash device out of the operable state in response to the return from the second photographic mode to the first photographic mode.

188. An apparatus according to claim 187, and further comprising operation means for enabling by manual operation a return of the camera from the second photographic mode to the first photographic mode at a time other than at the time of completion of one photograph.

189. An apparatus for changing over photographic modes of a camera, comprising:
(a) photographic mode change-over means for changing over the camera from a first photographic mode to a second photographic mode;
(b) return means for automatically returning the camera from the second photographic mode to the first photographic mode upon completion of one photograph; and
(c) flash change-over means for releasing a flash device out of an operable state in which it is able to flash in response to the return from the second photographic mode to the first photographic mode.

190. An apparatus according to claim 189, and further comprising operation means for enabling by manual operation a return of the camera from the second photographic mode to the first photographic mode at a time other than at the time of completion of one photograph.

191. An apparatus for changing over photographic modes of a camera, comprising:
(a) photographic mode change-over means for changing over the camera from a first photographic mode to a second photographic mode;
(b) return means for automatically returning the camera from the second photographic mode to the first photographic mode upon completion of one photograph; and
(c) flash change-over means for releasing a flash device out of an operable state in response to the return from the second photographic mode to the first photographic mode.

192. An apparatus according to claim 191, and further comprising operation means for enabling by manual operation a return of the camera from the second photographic mode to the first photographic mode at a time other than at the time of completion of one photograph.

193. An apparatus for changing over photographic modes of a camera, comprising:
(a) photographic mode change-over means for changing over the camera from a first photographic mode to a second photographic mode;
(b) return means for automatically returning the camera from the second photographic mode to the first photographic mode in response to a preparatory operation for a subsequent photograph; and
(c) flash change-over means for getting a flash device into an operable state able to flash in response to the change-over to the second photographic mode and for releasing the flash device out of the operable state in response to the return from the second photographic mode to the first photographic mode.

194. An apparatus according to claim 193, and further comprising operation means for enabling by manual operation a return of the camera from the second photographic mode to the first photographic mode at a time other than at the time of the preparatory operation for a subsequent photograph.

195. An apparatus for changing over photographic modes of a camera, comprising:
(a) photographic mode change-over means for changing over the camera from a first photographic mode to a second photographic mode;
(b) return means for automatically returning the camera from the second photographic mode to the first photographic mode in response to a preparatory operation for a subsequent photograph; and
(c) flash change-over means for getting a flash device into an operable state in response to the change-over to the second photographic mode and for releasing the flash device out of the operable state in response to the return from the second photographic mode to the first photographic mode.

196. An apparatus according to claim 195, and further comprising operation means for enabling by manual operation a return of the camera from the second photographic mode to the first photographic mode at a time other than at the time of the preparatory operation for a subsequent photograph 197. An apparatus for changing over photographic modes of a camera, comprising:
(a) photographic mode change-over means for changing over the camera from a first photographic mode to a second photographic mode;
(b) return means for automatically returning the camera from the second photographic mode to the first photographic mode in response to a preparatory operation for a subsequent photograph; and
(c) flash change-over means for releasing a flash device out of an operable state in which it is able to flash in response to the return from the second photographic mode to the first photographic mode.

198. An apparatus according to claim 197, and further comprising operation means for enabling by manual operation a return of the camera from the second photographic mode to the first photographic mode at a time other than at the time of the preparatory operation for a subsequent photograph.

199. An apparatus for changing over photographic modes of a camera, comprising:
(a) photographic mode change-over means for changing over the camera from a first photographic mode to a second photographic mode;
(b) return means for automatically returning the camera from the second photographic mode to the first photographic mode in response to a preparatory operation for a subsequent photograph; and
(c) flash change-over means for releasing a flash device out of an operable state in response to the return from the second photographic mode to the first photographic mode.

200. An apparatus according to claim 199, and further comprising operation means for enabling by manual operation a return of the camera from the second photographic mode to the first photographic mode at a time other than at the time of the preparatory operation for a subsequent photograph.

201. A camera, comprising:
(a) photographic mode change-over means for changing over the camera from a first photographic mode to a second photographic mode;
(b) return means for automatically returning the camera from the second photographic mode to the first photographic mode upon completion of one photograph; and
(c) flash change-over means for getting a flash device into an operable state able to flash in response to the change-over to the second photographic mode and for releasing the flash device out of the operable state in response to the return from the second photographic mode to the first photographic mode.

202. A camera according to claim 201, and further comprising operation means for enabling by manual operation a return of the camera from the second photographic mode to the first photographic mode at a time other than at the time of completion of one photograph.

203. A camera, comprising:
(a) photographic mode change-over means for changing over the camera from a first photographic mode to a second photographic mode;
(b) return means for automatically returning the camera from the second photographic mode to the first photographic mode upon completion of one photograph; and
(c) flash change-over means for getting a flash device into an operable state in response to the change-over to the second photographic mode and for releasing the flash device out of the operable state in response to the return from the second photographic mode to the first photographic mode.

204. A camera according to claim 203, and further comprising operation means for enabling by manual operation a return of the camera from the second photographic mode to the first photographic mode at a time other than at the time of completion of one photograph.

205. A camera, comprising:
(a) photographic mode change-over means for changing over the camera from a first photographic mode to a second photographic mode;
(b) return means for automatically returning the camera from the second photographic mode to the first photographic mode upon completion of one photograph; and
(c) flash change-over means for releasing a flash device out of an operable state in which it is able to flash in response to the return from the second photographic mode to the first photographic mode.

206. A camera according to claim 205, and further comprising operation means for enabling by manual operation a return of the camera from the second photographic mode to the first photographic mode at a time other than at the time of completion of one photograph.

207. A camera, comprising:
(a) photographic mode change-over means for changing over the camera from a first photographic mode to a second photographic mode;
(b) return means for automatically returning the camera from the second photographic mode to the first photographic mode upon completion of one photograph; and
(c) flash change-over means for releasing a flash device out of an operable state in response to the return from the second photographic mode to the first photographic mode.

208. A camera according to claim 207, and further comprising operation means for enabling by manual operation a return of the camera from the second photographic mode to the first photographic mode at a time other than at the time of completion of one photograph.

209. A camera, comprising:
(a) photographic mode change-over means for changing over the camera from a first photographic mode to a second photographic mode;
(b) return means for automatically returning the camera from the second photographic mode to the first photographic mode in response to a preparatory operation for a subsequent photograph; and
(c) flash change-over means for getting a flash device into an operable state able to flash in response to the change-over to the second photographic mode and for releasing the flash device out of the operable state in response to the return from the second photographic mode to the first photographic mode.

210. A camera according to claim 209, and further comprising operation means for enabling by manual operation a return of the camera from the second photographic mode to the first photographic mode at a time other than at the time of the preparatory operation for a subsequent photograph.

211. A camera, comprising:
(a) photographic mode change-over means for changing over the camera from a first photographic mode to a second photographic mode;
(b) return means for automatically returning the camera from the second photographic mode to the first photographic mode in response to a preparatory operation for a subsequent photograph; and
(c) flash change-over means for getting a flash device into an operable state in response to the change-over to the second photographic mode and for releasing the flash device out of the operable state in response to the return from the second photographic mode to the first photographic mode.

212. A camera according to claim 211, and further comprising operation means for enabling by manual operation a return of the camera from the second photographic mode to the first photographic mode at a time other than at the time of the preparatory operation for a subsequent photograph.

213. A camera, comprising:
(a) photographic mode change-over means for changing over the camera from the first photographic mode to a second photographic mode;
(b) return means automatically returning the camera from the second photographic mode to the first photographic mode in response to a preparatory operation for a subsequent photograph; and
(c) flash change-over means for releasing a flash device out of an operable state in which it is able to flash in response to the return from the second photographic mode to the first photographic mode.

214. A camera according to claim 213, and further comprising operation means for enabling by manual operation a return of the camera from the second photographic mode to the first photographic mode at a time other than at the time of the preparatory operation for a subsequent photograph.

215. A camera, comprising:
(a) photographic mode change-over means for changing over the camera from a first photographic mode to a second photographic mode;
(b) return means for automatically returning the camera from the second photographic mode to the first photographic mode in response to a preparatory operation for a subsequent photograph; and
(c) flash change-over means for releasing a flash device out of an operable state in response to the return from the second photographic mode to the first photographic mode.

216. A camera according to claim 215, and further comprising operation means for enabling by manual operation a return of the camera from the second photographic mode to the first photographic mode at a time other than at the time of the preparatory operation for a subsequent photograph.

217. A camera, comprising:
(a) photographic mode change-over means for changing over the camera from a first photographic mode to a second photographic mode;
(b) finder change-over means for changing the direction of a visual field of a finder in response to the change-over by the photographic mode change-over means from the first photographic mode to the second photographic mode; and
(c) return means for automatically returning the camera from the second photographic mode to the first photographic mode upon completion of one photograph.

218. A camera according to claim 217, and further comprising operation means for enabling by manual operation a return of the camera from the second photographic mode to the first photographic mode at a time other than at the time of completion of one photograph.

219. A camera, comprising:
(a) photographic mode change-over means for changing over the camera from a first photographic mode to a second photographic mode;
(b) flash change-over means for getting a flash device into a state for the flash emission in response to the change-over by the photographic mode change-over means from the first photographic mode to the second photographic mode; and
(c) return means for automatically returning the camera from the second photographic mode to the first photographic mode upon completion of one photograph.

220. A camera according to claim 219, and further comprising operation means for enabling by manual operation a return of the camera from the second photographic mode to the first photographic mode at a time other than at the time of completion of one photograph.

221. A camera, comprising:
(a) photographic mode change-over means for changing over the camera from a first photographic mode to a second photographic mode;
(b) flash change-over means for getting a flash device into an operable state in response to the change-over by the photographic mode change-over means from the first photographic mode to the second photographic mode; and
(c) return means for automatically returning the camera from the second photographic mode to the first photographic mode upon completion of one photograph.

222. A camera according to claim 221, and further comprising operation means for enabling by manual operation a return of the camera from the second photographic mode to the first photographic mode at a time other than at the time of completion of one photograph.

223. A camera, comprising:
(a) photographic mode change-over means for changing over the camera from a first photographic mode to a second photographic mode;
(b) finder change-over means for changing the direction of a visual field of a finder in response to the change-over by the photographic mode change-over means from the first photographic mode to the second photographic mode; and
(c) return means for automatically returning the camera from the second photographic mode to the first photographic mode in response to a preparatory operation for a subsequent photograph.

224. A camera according to claim 223, and further comprising operation means for enabling by manual operation a return of the camera from the second photographic mode to the first photographic mode at a time other than at the time of the preparatory operation for a subsequent photograph.

225. A camera, comprising:
(a) photographic mode change-over means for changing over the camera from a first photographic mode to a second photographic mode;
(b) flash change-over means for getting a flash device into a state ready for the flash emission in response to the change-over by the photographic change-over means from the first photographic mode to the second photographic mode; and
(c) return means for automatically returning the camera from the second photographic mode to the first photographic mode in response to a preparatory operation for a subsequent photograph.

226. A camera according to claim 225, and further comprising operation means for enabling by manual operation a return of the camera from the second photographic mode to the first photographic mode at a time other than at the time of the preparatory operation for a subsequent photograph.

227. A camera, comprising:

(a) photographic mode change-over means for changing over the camera from a first photographic mode to a second photographic mode;
(b) flash change-over means for getting a flash device into an operable state in response to the change-over by the photographic mode change-over means from the first photographic mode to the second photographic mode; and
(c) return means for automatically returning the camera from the second photographic mode to the first photographic mode in response to a preparatory operation for a subsequent photograph.

228. A camera according to claim 227, and further comprising operation means for enabling by manual operation a return of the camera from the second photographic mode to the first photographic mode at a time other than at the time of the preparatory operation for a subsequent photograph.

229. An apparatus for changing over photographic modes of a camera, comprising:
(a) photographic mode change-over means for changing over the camera from a first photographic mode to a second photographic mode;
(b) finder change-over means for changing the direction of a visual field of a finder in response to the change-over by the photographic mode change-over means from the first photographic mode to the second photographic mode; and
(c) return means for automatically returning the camera from the second photographic mode to the first photographic mode in response to a preparatory operation for a subsequent photograph.

230. An apparatus according to claim 229, and further comprising operation means for enabling by manual operation a return of the camera from the second photographic mode to the first photographic mode at a time other than at the time of the preparatory operation for a subsequent photograph.

231. An apparatus for changing over the photographic modes of a camera, comprising:
(a) photographic mode change-over means for changing over the camera from a first photographic mode to a second photographic mode;
(b) flash change-over means for getting a flash device into a state ready for the flash emission in response to the change-over by the photographic mode change-over means from the first photographic mode to the second photographic mode; and
(c) return means automatically for returning the camera from the second photographic mode to the first photographic mode in response to a preparatory operation for a subsequent photograph.

232. An apparatus according to claim 231, and further comprising operation means for enabling by manual operation a return of the camera from the second photographic mode to the first photographic mode at a time other than at the time of the preparatory operation for a subsequent photograph.

233. An apparatus for changing over the photographic modes of a camera, comprising:
(a) photographic mode change-over means for changing over the camera from a first photographic mode to a second photographic mode;
(b) flash change-over means for getting a flash device into an operable state in response to the change-over by the photographic mode change-over means from the first photographic mode to the second photographic mode; and
(c) return means for automatically returning the camera from the second photographic mode to the first photographic mode in response to a preparatory operation for a subsequent photograph.

234. An apparatus according to claim 233, and further comprising operation means for enabling by manual operation a return of the camera from the second photographic mode to the first photographic mode at a time other than at the time of the preparatory operation for a subsequent photograph.

* * * * *